US006985478B2

(12) United States Patent
Pogossiants et al.

(10) Patent No.: US 6,985,478 B2
(45) Date of Patent: Jan. 10, 2006

(54) USING XML EXPRESSED PRIMITIVES FOR PLATFORM AND SYSTEM-INDEPENDENT CALL MODELING

(75) Inventors: Gregory Pogossiants, Palo Alto, CA (US); Nikolay Anisimov, Concord, CA (US); Dan Kikinis, Saratoga, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 903 days.

(21) Appl. No.: 09/827,608

(22) Filed: Apr. 6, 2001

(65) Prior Publication Data

US 2001/0028649 A1 Oct. 11, 2001

Related U.S. Application Data

(63) Continuation-in-part of application No. 09/024,923, filed on Feb. 17, 1998.

(60) Provisional application No. 60/267,294, filed on Feb. 7, 2001.

(51) Int. Cl.
*H04L 12/66* (2006.01)
*H04L 12/28* (2006.01)
*H04L 12/56* (2006.01)
*H04J 3/16* (2006.01)
*H04J 3/22* (2006.01)

(52) U.S. Cl. .................... 370/352; 370/401; 370/466
(58) Field of Classification Search .............. 370/352, 370/353, 354, 355, 356, 401, 466
See application file for complete search history.

(56) References Cited

U.S. PATENT DOCUMENTS 6,175,564 B1 * 1/2001 Miloslavsky et al. ....... 370/352
6,407,996 B1 * 6/2002 Witchalls ................... 370/352
6,459,697 B1 * 10/2002 Neyman ..................... 370/352
6,597,685 B2 * 7/2003 Miloslavsky et al. ....... 370/352
6,625,139 B2 * 9/2003 Miloslavsky et al. ....... 370/352
6,628,666 B1 * 9/2003 Pickering et al. .......... 370/468
6,760,322 B1 * 7/2004 Fukuda et al. ............. 370/352

(Continued)

OTHER PUBLICATIONS

Sheng-Lin, Chou & Yi-Bing, Lin; IEEE Communications Surveys & Tutorials; Computer Telephony Integration and its Applications; First Quarter 2000, vol. 3 No. 1.*

*Primary Examiner*—Ricky Ngo
*Assistant Examiner*—Feben Haile
(74) *Attorney, Agent, or Firm*—Donald R. Boys; Central Coast Patent Agency, Inc.

(57) ABSTRACT

A system for providing third-party call control in a telecommunications environment is provided. The system comprises, a call-control mechanism for providing service logic and routing intelligence, a control application for providing service-logic description and command instruction for implementing third-party controlled call connections, a call-switching mechanism for providing an abstract state of switching matrix and for commutation of external and internal call legs and a commutation application for making and breaking call connections according to commands sent from the control application. The call-control mechanism, using the control application, sends primitive text commands to the call-switching mechanism, which utilizing the commutation application, receives, reads and implements the text commands containing all of the service logic and instructions required to successfully construct call connections and wherein the call-switching mechanism by virtue of the commutation application sends notification of success or failure regarding implementation of received commands back to the control application.

24 Claims, 13 Drawing Sheets

U.S. PATENT DOCUMENTS

| | | | |
|---|---|---|---|
| 6,785,375 B1 * | 8/2004 | Beddus et al. | 379/220.01 |
| 6,801,928 B2 * | 10/2004 | Nuestro | 709/203 |
| 2001/0005372 A1 * | 6/2001 | Cave et al. | 370/401 |
| 2002/0051463 A1 * | 5/2002 | Higuchi | 370/466 |
| 2002/0106071 A1 * | 8/2002 | Uppaluru et al. | 379/265.02 |
| 2002/0114441 A1 * | 8/2002 | Coussement | 379/265.06 |
| 2002/0120691 A1 * | 8/2002 | Patil et al. | 709/206 |
| 2003/0115353 A1 * | 6/2003 | Deryugin et al. | 709/231 |

* cited by examiner

USING XML EXPRESSED PRIMITIVES FOR PLATFORM AND SYSTEM-INDEPENDENT CALL MODELING

CROSS-REFERENCE TO RELATED DOCUMENTS

The present patent application claims priority to Provisional Patent Application Ser. No. 60/267,294, entitled *"Using XML Expressed Primitives for Platform and System-Independent Call Modeling"* filed on Feb. 7, 2001. This application is also a continuation-in-part of application Ser. No. 09/024,923, entitled *"Telephone Network Interface Bridge Between Data Telephony Networks and Dedicated Connection Telephony Networks"*, that was filed on Feb. 17, 1998, complete disclosure of both priority documents is included herein in entirety by reference.

FIELD OF THE INVENTION

The present invention is in the area of telephony technology including data-network-telephony (DNT), and pertains more particularly to methods and apparatus providing third-party call control for switching and routing telephony calls.

BACKGROUND OF THE INVENTION

In the field of telephony communication, there have been many technological advances in technology over the years that have contributed to more efficient use of telephone communication within hosted call-center environments. Most of these improvements involve integrating the telephones and switching systems in such call centers with computer hardware and software adapted for, among other things, better routing of telephone calls, faster delivery of telephone calls and associated information, and improved service with regards to client satisfaction. Such computer-enhanced telephony is known in the art as computer-telephony integration (CTI).

Generally speaking, CTI implementations of various design and purpose are implemented both within individual call-centers and, in some cases, at the telephone network level. For example, processors running CTI software applications may be linked to telephone switches, service control points (SCP), and network entry points within a public or private telephone network. At the call-center level, CTI-enhanced processors, data servers, transaction servers, and the like, are linked to telephone switches and, in some cases, to similar CTI hardware at the network level, often by a dedicated digital link. CTI and other hardware within a call-center is commonly referred to as customer premises equipment (CPE). It is the CTI processor and application software in such centers that provides computer enhancement to a call center.

In a CTI-enhanced call center, telephones at agent stations are connected to a central telephony switching apparatus, such as an automatic call distributor (ACD) switch or a private branch exchange (PBX). The agent stations may also be equipped with computer terminals such as personal computer/video display units (PC/VDUs) so that agents manning such stations may have access to stored data as well as being linked to incoming callers by telephone equipment. Such stations may be interconnected through the PC/VDUs by a local area network (LAN). One or more data or transaction servers may also be connected to the LAN that interconnects agent stations. The LAN is, in turn, connected to the CTI processor, which is connected to the call switching apparatus of the call center.

In recent years, further advances in computer technology, telephony equipment, and infrastructure have provided many opportunities for improving telephone service in publicly switched and private telephone intelligent networks. Similarly, development of a separate information and data network known as the Internet, together with advances in computer hardware and software have led to a new multi-media telephone system known in the art by several names. In this new systemology, telephone calls are simulated by multi-media computer equipment, and data, such as audio data, is transmitted over data networks as data packets. In this application the broad term used to describe such computer-simulated telephony is Data-Network Telephony (DNT).

A typical DNT system is not a dedicated or connection oriented system. That is, data, including audio data, is prepared, sent, and received as data packets. The data packets share network links, and may travel by varied and variable paths. There is thus no generally dedicated bandwidth, unless special systems, such as RSVP systems known in the art, are used for guaranteeing bandwidth during a call. DNT calls must share the bandwidth available on the network in which they are traveling.

Recent improvements to available technologies associated with the transmission and reception of data packets during real-time DNT communication have made it possible to successfully add DNT, principally, Internet Protocol Network Telephony (IPNT) capabilities to existing CTI call centers. Such improvements, as described herein and known to the inventors, include methods for guaranteeing and verifying available bandwidth or quality of service (QoS) for a transaction, improved mechanisms for organizing, coding, compressing, and carrying data more efficiently using less bandwidth, and methods and apparatus for intelligently replacing lost data via using voice supplementation methods and enhanced buffering capabilities.

In typical call centers, DNT is accomplished by Internet connection and IPNT calls. In systems known to the inventors, incoming IPNT calls are processed and routed within an IPNT-capable call-center in much the same way as COST calls are routed in a CTI-enhanced center, using similar or identical call models. A call model is essentially a set of services and logic provided for enabling call routing, switching, and so on.

Call centers having both CTI and IPNT capability utilize LAN-connected agent-stations with each station having a telephony-switch-connected headset or phone, and a PC connected, in most cases via LAN, to the network carrying the IPNT calls. Therefore, in most cases, IPNT calls are routed to the agent's PC while conventional telephony calls are routed to the agent's conventional telephone or headset.

Companies have, for some time, experimented with various forms of integration between the older COST systems and newer IPNT systems. For example, by enhancing data servers, interactive voice response units (IVR), agent-connecting networks, and so on, with the capability of understanding Internet protocol, data arriving from either network may be integrated requiring less equipment and lines to facilitate processing, storage, and transfer of data.

In a network system known to the inventors and described with reference to Ser. No. 09/024,923, listed in the Cross-Reference section, a computerized telephony bridge unit maintained in the network has a Data Network Telephony (DNT) Port and a Connection Oriented/Switched Telephony (COST) trunk port. Each port is associated with circuitry for receiving and placing calls in the data format required by the connected networks. The bridge unit further comprises conversion circuitry for converting data dynamically between network protocols compatible with each connected network.

In this system, control routines are provided and are executable on the computerized bridge unit. The control routines are adapted to receive a first call from one of the COST or DNT networks, to place a call associated with the received call on the network other than the network on which the call is received, and to dynamically convert data between a call connected at one port and a call connected at the other port. The data network can be the Internet, and the COST network can be any publicly or privately switched dedicated-connection-oriented telephone network.

One with skill in the art will recognize that there are several Internet protocols, CTI protocols, and Device protocols, which have been proposed and adopted as standard or semi-standard protocols for streamlining integrated telephony between disparate networks. For example, an Internet protocol known as H.323 is a standard approved by the International Telecommunication Union (ITU) that defines how audiovisual conferencing data is transmitted across networks. In theory, H.323 should enable users to participate in a same telephony conference even though they are using different videoconferencing applications. Although most videoconferencing vendors maintain that their products conform to H.323, such adherence may not actually produce seamless inter-operability.

Another known protocol termed Media Gateway Control Protocol (MGCP) was developed by Telcordia™ in cooperation with Level 3 Communications™. This protocol is an internal protocol which is was developed to work with existing signaling protocols such as H.323, SIP or SS7. One reason new standards are being developed is because of the growing popularity of what is termed Voice over IP (VoIP).

Standard telephones are relatively inexpensive because they are not complex in terms of intelligence. Standard telephones work with specific switches at some central switching apparatus, if they happen to be so connected. IP telephones and devices, on the other hand, are not fixed to a specific switch, so they must contain processors that enable them with the operating intelligence that is independent from a central switching location (no third party control). MGCP is meant to simplify standards for this new technology by eliminating the need for complex, processor-intense IP telephony devices by providing some third party control, thus simplifying and lowering the cost of these end terminals.

A protocol representing a basic telephony call model is known to the inventors as Computer-Supported Telephony Applications (CSTA). ECMA is the international standards organization that defined the CSTA resource model and protocol. To connect a telephone system to Computer Telephony (CT) Connect, a telephone system vendor must provide a CSTA-compliant, ASN.1 encoded message flow. This can be provided across a number of different transports, but TCP/IP is becoming the most popular.

Although the developed protocols do much to facilitate seamless communication between networks adding some third party call control, it becomes apparent that third party control over telephony practiced in VoIP applications is severely limited. Proposed prior-art solutions using developed and hopefully standardized protocols in addition to the provision of special gateways has added complexity more than simplicity for enterprises attempting to integrate CTI telephony regimens into VoIP and other data packet venues.

Arguably, the most frustrating of these challenges is providing consistent call model representation both at the call control entity (CCE) and the switching entity (SWE). Traditionally, CTI protocols for dedicated networks have been largely vendor-specific, forcing CTI software vendors to develop separate software modules for each switch model. The above-mentioned protocols were proposed and developed as potential standards for CTI links.

Unfortunately, attempts of such CTI protocol standardization are not likely to produce compatible implementations. It is easy to see that any non-trivial CTI software suite has a need to maintain an accurate replica of the switch state, which in practice means that the CTI software has to replicate the call model of a particular switch.

Any discrepancy between an actual call model implemented by a switch vendor and its reverse-engineered replica in CTI control software causes loss of coherency between the actual switching state and its image in the control software. Moreover, practically all switch vendors introduce subtle changes to their call model in successive versions of switch software (this is unavoidable when new features are added and programming errors are corrected). Packet telephony makes utilization of call models even more complicated by replacing centralized switches with a heterogeneous, distributed switching environment, multiplying the effects of programming errors, revision levels etc.

What is clearly needed is a low-level protocol that enables negotiation over a network between a CCE having service logic and a SWE providing only switching functions such that only one call model is required and SWE functions may be implemented according to attributes of the model.

Furthermore, it is desirable, for such a protocol to run on as many devices, systems etc. without much adaptation.

SUMMARY OF THE INVENTION

In an embodiment of the present invention, a system for providing third-party call control in a telecommunications environment is provided. The system comprises, a call-control mechanism connected to the LAN for providing service logic and routing intelligence for initiating call connections, a control application running on the call-control mechanism, the control application providing the service-logic description and connection request command instruction for implementing third-party controlled call connections, a call-switching mechanism accessible to the call-control mechanism, the call-switching mechanism for providing an abstract state of switching matrix and for commutation of external and internal call legs making up a connected call and a commutation application running on the call-switching mechanism, the commutation application for making and breaking call connections according to instructional commands sent from the control application. The call-control mechanism, using the control application, sends primitive text commands to the call-switching mechanism, which utilizing the commutation application, receives, reads and implements the text commands containing all of the service logic and instructions required to successfully construct call connections and wherein the call-switching mechanism by virtue of the commutation application sends notification of success or failure regarding implementation of received commands back to the control application.

In one aspect, the telecommunications environment includes a Voice over Internet Protocol (VoIP) network. In a preferred aspect, the call-control mechanism is a computer-telephony-integration (CTI) server. In one aspect, the call-switching mechanism is a PBX telephony switch. In another aspect, the call-switching mechanism is an ACD telephony switch. In yet another aspect, the call-switching mechanism is a voice over Internet protocol (VoIP) gateway. In all aspects, the control application contains a call model, the attributes thereof defined in low-level descriptor language. In an embodiment, the low-level descriptor language is extensible markup language (XML). In all aspects, the commutation application contains a representation of a switching matrix, the attributes thereof defined in low-level descriptor language. In a preferred embodiment, the low-level descriptor language is extensible markup language (XML).

In an embodiment, the telecommunications environment is an enterprise communications center connected for communication to a dedicated telephone network and to a data-packet-network. In this preferred embodiment, the telephone network is a public switched telephone network (PSTN) and the data-packet-network is the Internet network.

In another aspect of the present invention, a method for providing third-party call control in a LAN-enabled telecommunications environment is provided. The method comprises the steps of, (a) providing a call-control-entity, the entity having a single call model, the call model containing service logic, port identifications and identification of possible endpoints and gateways within the telecommunications environment, (b) expressing the singular attributes of the call model using a low-level descriptor language, (c) providing a physical and/or virtual switching matrix, the switching matrix containing the physical and/or virtual port identifications and states thereof expressed in the low-level descriptor language, (d) sending a command using the low-level descriptor language to a controller of the switching matrix, the command to initiate a call connection based on selected attributes of the call model, (e) processing the command at the switching matrix and (f) notifying the call-control-entity of the results of command processing at the switching matrix.

In one aspect of the method in step (a), the call-control-entity is a computer-telephony-integration server and the telecommunications environment includes a Voice over Internet Protocol (VoIP) network. In step (b), the low-level descriptor language is, in preferred application, extensible-markup-language (XML). In one aspect of the method in step (c), the switching matrix is that of a PBX telephone switch. In another aspect in step (c), the switching matrix is that of an Internet protocol router. In still another aspect in step (c), the switching matrix is that of a Voice over Internet Protocol (VoIP) gateway. In all aspects in step (d), the controller of the switching matrix is a software application that understands low-level language. In one aspect of the method, the telecommunications environment comprises a telecommunications center connected for communication to a telephone network and to a data-packet-network. In this aspect of the method, the telephone network is preferably a public-switched-telephone-network (PSTN), and the data-packet-network is preferably an Internet network. In some aspects of the method in step (e), processing the command includes setting up and tearing down call legs. Also in all aspects in step (f), notification of results is accomplished using low-level descriptor language. In an embodiment, the low-level language is extensible markup language (XML).

Now, for the first time, a low level protocol that enables negotiation over a network between a CCE having service logic and a SWE providing only switching functions is provided such that only one call model is required and SWE functions may be implemented according to attributes of the model.

BRIEF DESCRIPTION OF THE DRAWING FIGURES

Figure 7:
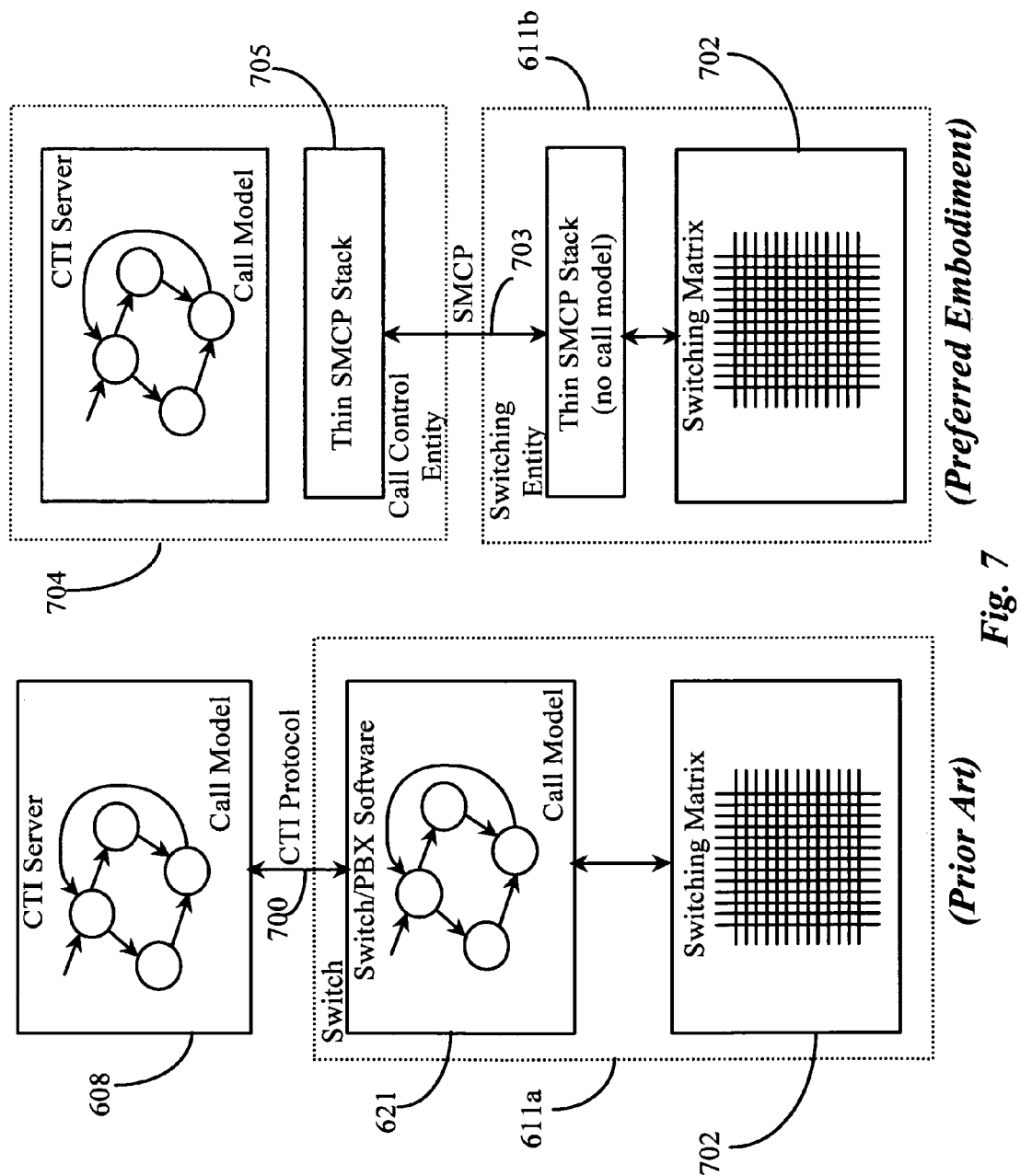
Figure 8:
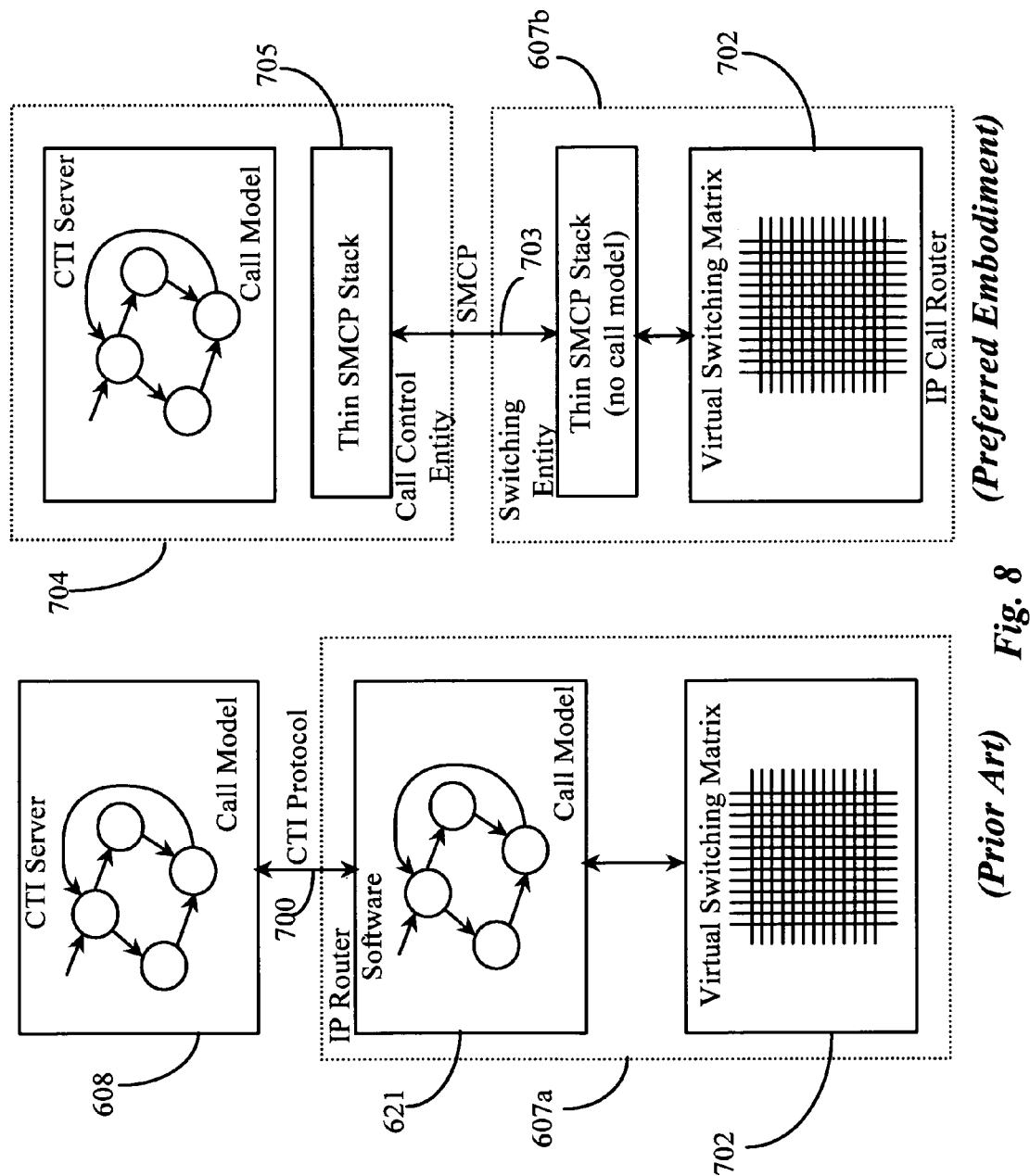
Figure 9:
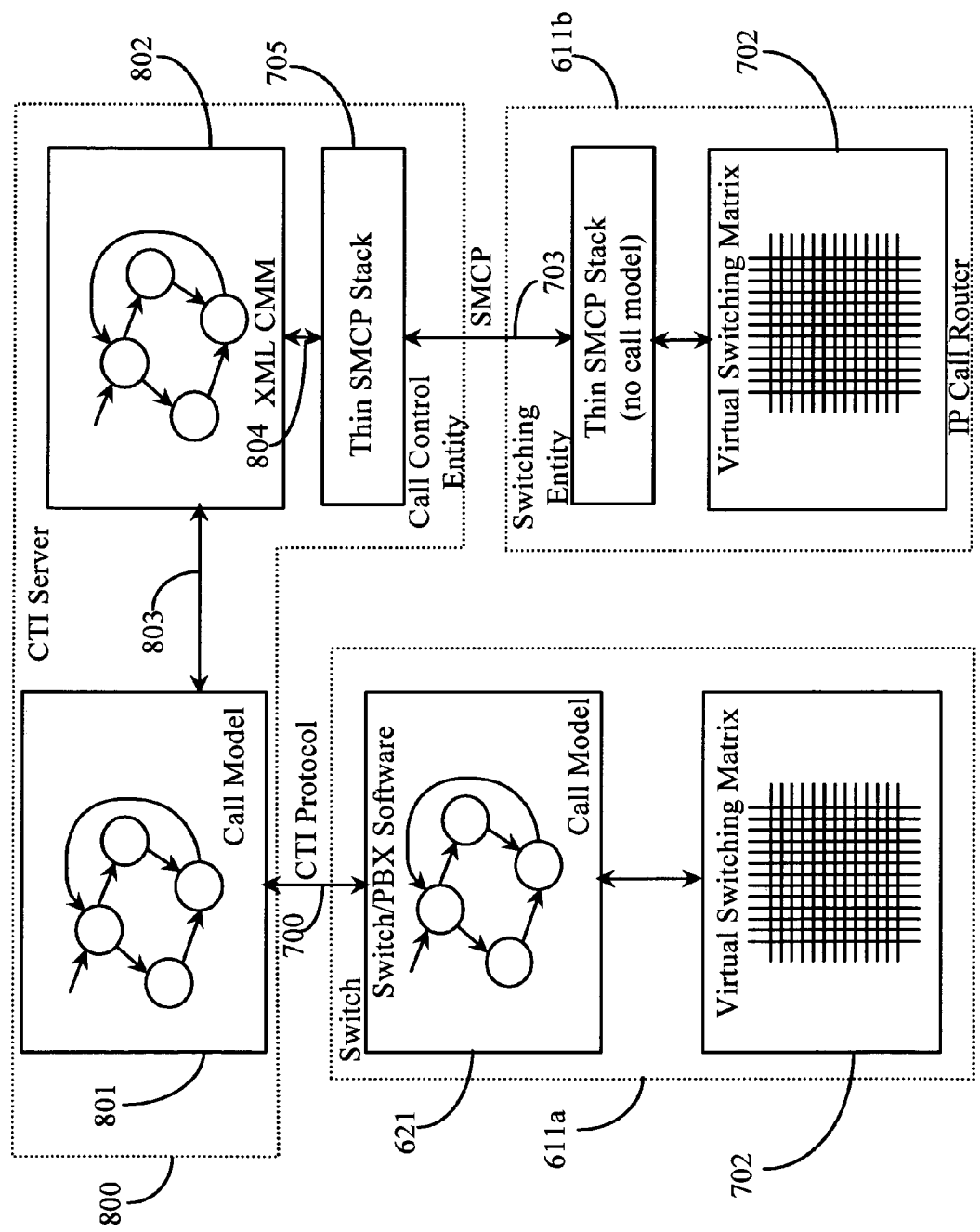

FIG. 7 is a block diagram illustrating CTI-PSTN call-model management approach according to an embodiment of the present invention FIG. 8 is a block diagram illustrating a CTI-IP call-model management approach according to another embodiment of the present invention FIG. 9 is a block diagram illustrating an XML based call-model management approach according to yet another embodiment of the present invention.

Figure 10:
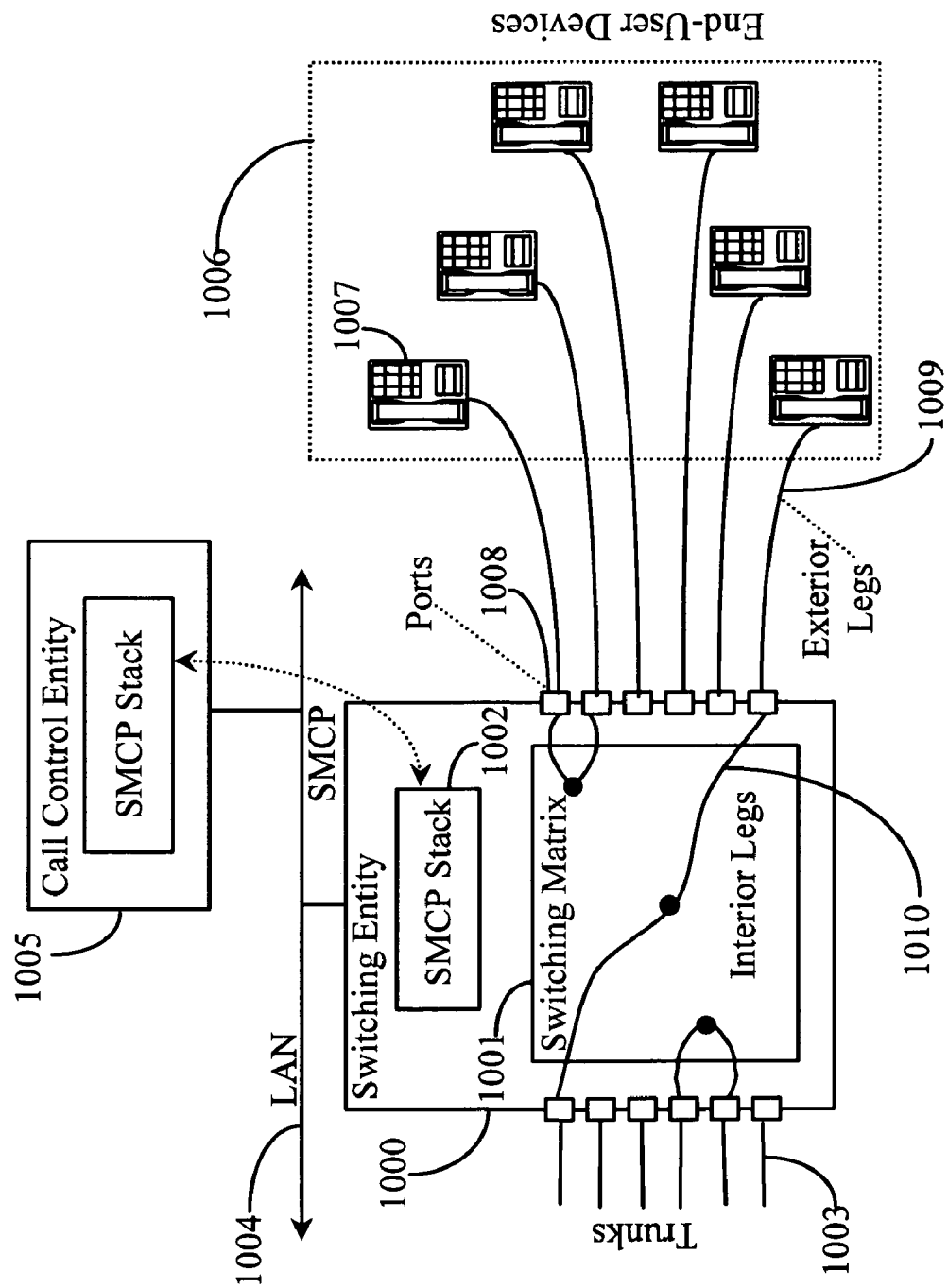

FIG. 10 is a block diagram illustrating SMCP control over interior and exterior call leg construction in a CTI scenario according to an embodiment of the present invention.

Figure 11:
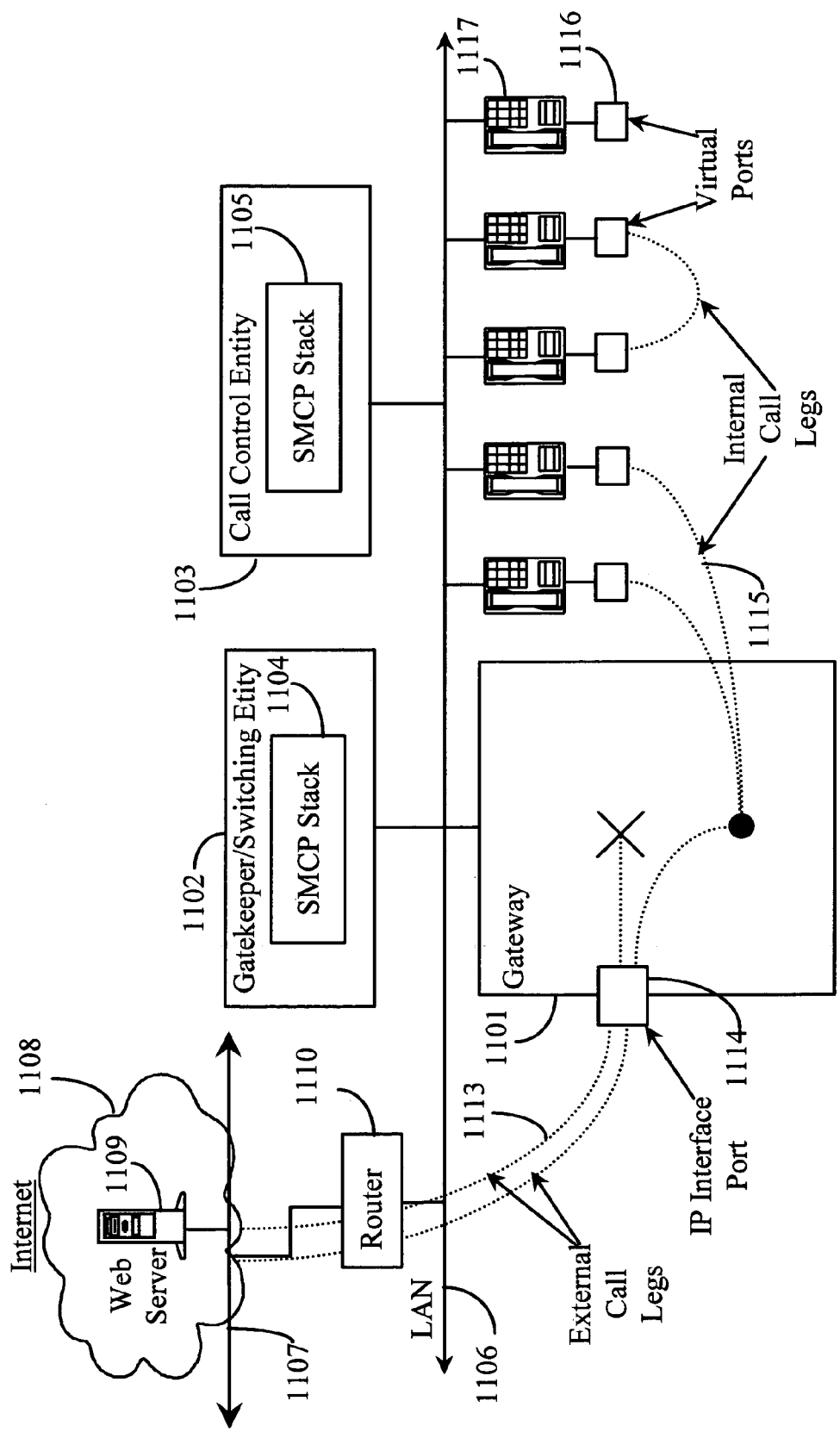

FIG. 11 is a block diagram illustrating SMCP control over interior and exterior call leg construction in a VoIP scenario according to an embodiment of the present invention.

Figure 12:
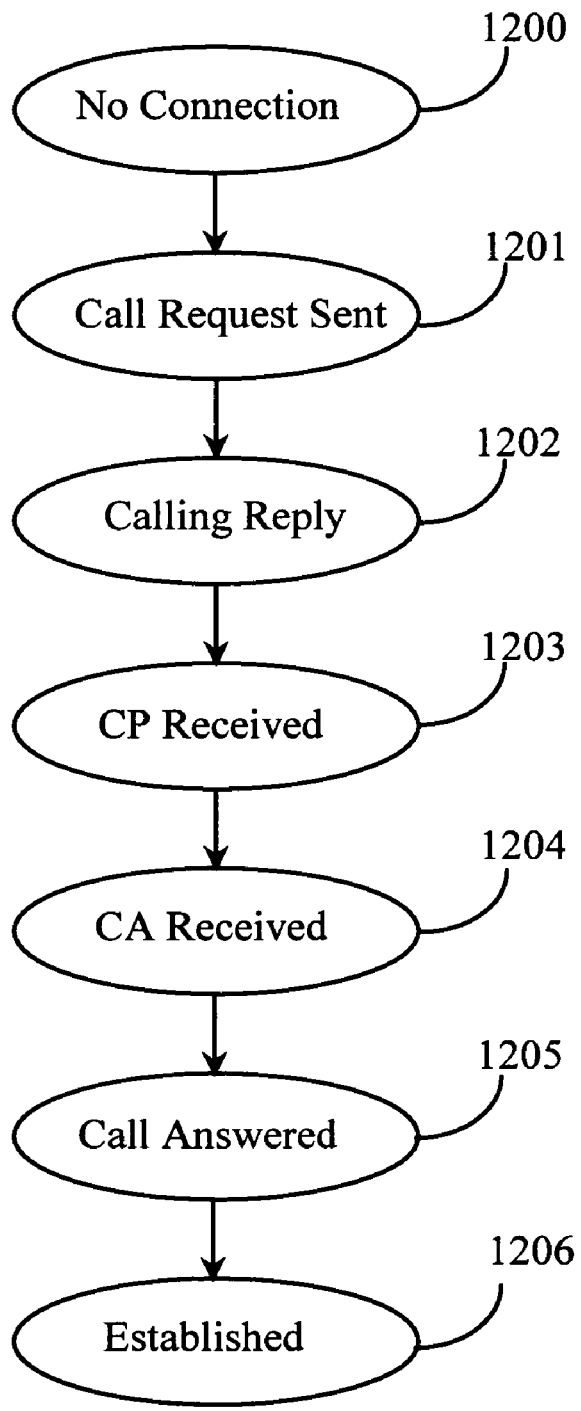

FIG. 12 is flow diagram illustrating basic steps for establishing an outbound call connection using XML-based SCMP.

Figure 13:
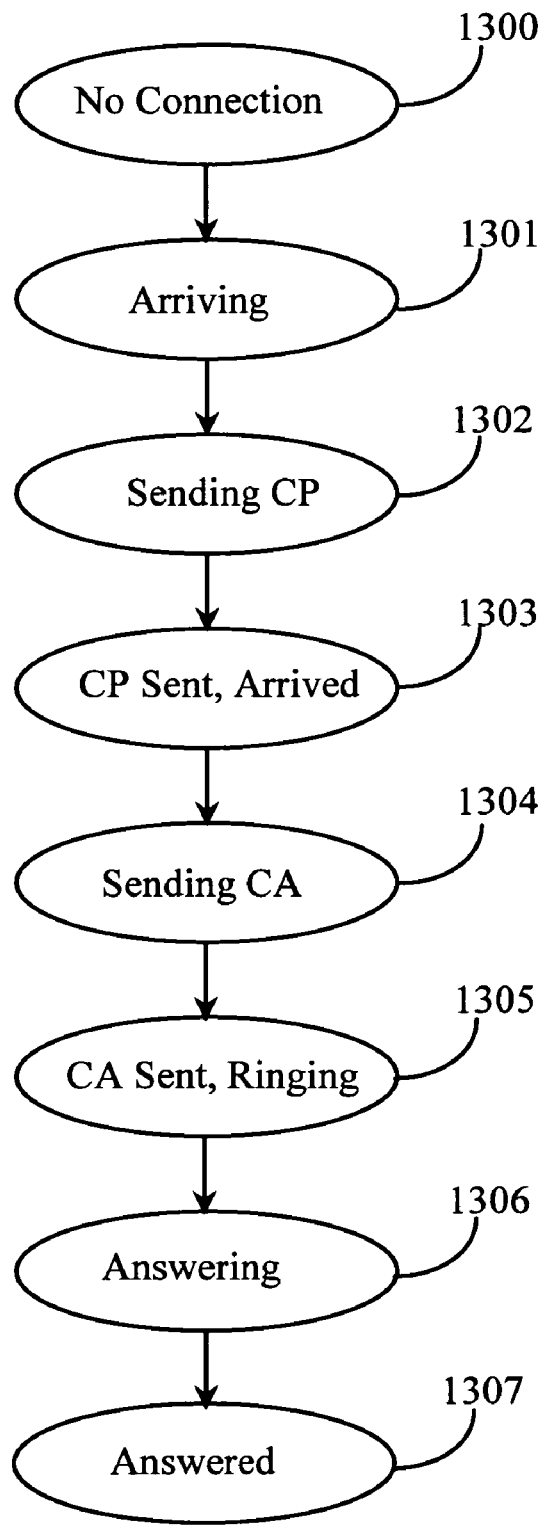

FIG. 13 is a flow diagram illustrating basic steps for establishing an incoming call connection using XML-based SCMP.

DESCRIPTION OF THE PREFERRED EMBODIMENTS

Figure 1:
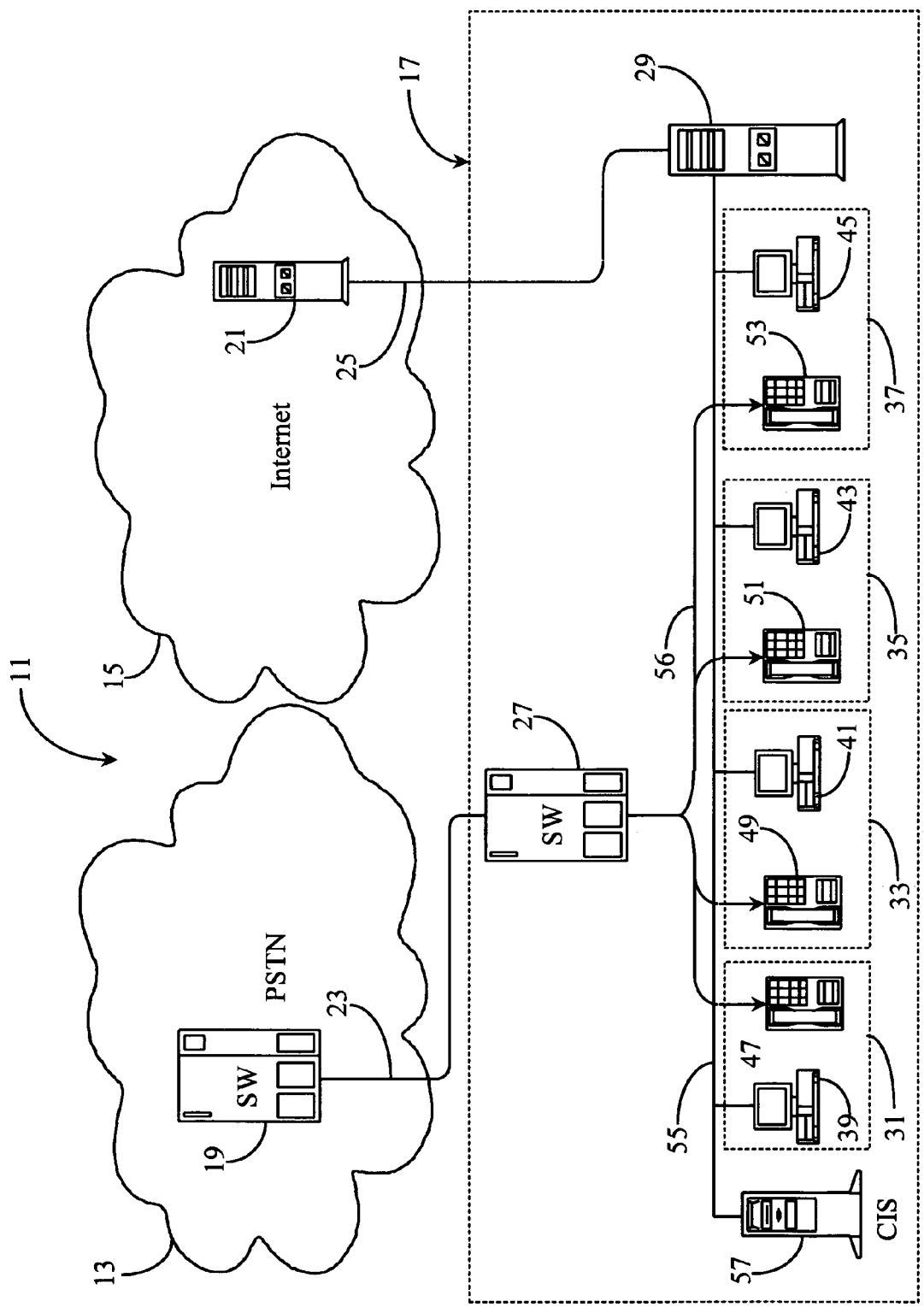
FIG. 1 is a system diagram of a prior art call center and network connections, wherein the call center is capable of both COST and DNT call handling.

FIG. 1 is a system diagram of a prior art call center and network connections, wherein the call center is capable of both COST and IPNT call handling. In FIG. 1 telecommunications network 11 comprises a publicly switched telephone network (PSTN) 13, the Internet network 15, and a call center 17. PSTN network 13 may be a private network rather than a public network, and Internet 15 may be another public or a private data network as are known in the art.

In this basic prior art example, call center 17 is equipped to handle both COST calls and IPNT calls. Both COST calls and IPNT calls are delivered to call-center 17 by separate network connections. For example, a telephony switch 19 in the PSTN may receive incoming telephone calls and rout them over a COST network connection 23 to a central switching apparatus 27 located within call center 17. IPNT calls via Internet 15 are routed via a data router 21 over a data-network connection 25 to an IPNT router 29 within call center 17. In this example, network switch 19 is meant to represent a wide variety of processing and switching equipment in a PSTN, and router 21 is exemplary of many routers and IP switches in the Internet, as known in the art.

Call center 17 further comprises four agent stations 31, 33, 35, and 37. Each of these agent stations, such as agent station 31, for example, comprises an agent's telephone 47 for COST telephone communication and an agent's PC/VDU 39 for IPNT communication and additional data processing and viewing. Agent's telephones 49, 51, and 53 along with agent's PC/VDU 41, 43, and 45 are in similar arrangement in agent stations 33, 35, and 37 respectively. Agent's telephones, such as agent's telephone 49, are connected to COST switching apparatus 27 via telephone wiring 56.

A LAN 55 connects agent's PC/VDU's to one another and to a CPE IPNT router 29. A customer-information-service (CIS) server 57 is connected to LAN 55 and provides additional stored information about callers to each LAN-connected agent. Router 29 routes incoming IPNT calls to agent's PC/VDU's that are also LAN connected as previously described. A data network connection 25 connects data router 29 to data router 21 located in Internet 15. Specific Internet access and connectivity is not shown, as such is well known in the art, and may be accomplished in any one of several ways. The salient feature to be emphasized in this prior art example is that separate connections and equipment are necessary and implemented to be able to handle both COST and IPNT calls at the call center.

Each agent's PC/VDU, such as PC/VDU 45 has a connection via LAN 55 and data network connection 25 to Internet 15 while the assigned agent is logged on to the system, however, this is not specifically required but rather preferred, so that incoming IPNT calls may be routed efficiently. Dial-up connecting rather than a continuous connection to Internet 15 may sometimes be employed.

An agent operating at an agent station such as agent station 33 may have COST calls arriving on agent's telephone 49 while IPNT calls are arriving on agent's PC/VDU 41. In this particular example lack of a connection between router 29 and switching apparatus 27 creates a cumbersome situation, requiring agents to distribute there time as best they can between the two types of calls. Thus, agent time is not utilized to maximum efficiency with respect to the total incoming calls possible from both networks.

Figure 2:
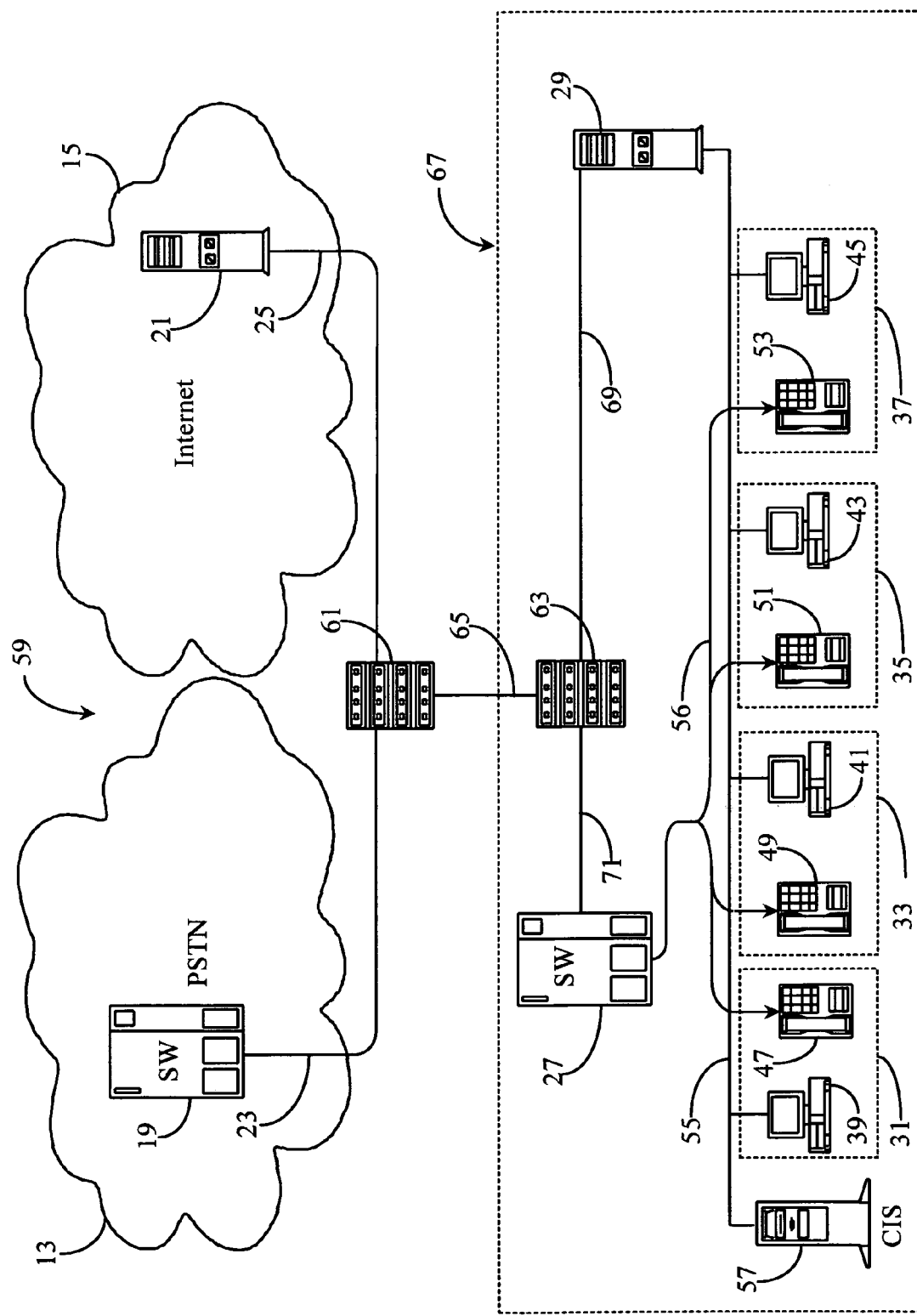
FIG. 2 is a system diagram of a prior art call center having a dedicated bridge connection for both DNT and COST calls

FIG. 2 is a system diagram of a prior art call center having a dedicated bridge connection for both IPNT and COST calls. Telecommunications network 59 comprises PSTN 13, Internet 15, and a call center 67. This prior art example is similar in architecture to the prior art example of FIG. 1 with an exception in how IPNT and COST calls are delivered to call center 67. Therefore, many of the same elements present in FIG. 1 are shown again in this example, such as telephony switching apparatus 27, agent stations 31–37, LAN connectivity, and so on.

Referring again to FIG. 2, a known network data bridging technique and apparatus is provided, most typically by a local phone company, wherein COST calls and IPNT calls may be routed side by side over one trunk to call center 67. This bridge comprises a first telephone-data modem 61, a suitable trunk connection such as a T1 or E1 trunk 65 as is known in the art, and a second telephone-data modem 63. Telephone-data modem 61 resides at the public-network level, typically with a local telephone company's equipment, but could also be in the PSTN cloud or even the Internet cloud. Telephone-data modem 61 is connected to the PSTN by exemplary COST telephony switch 19 via COST connection 23 and to exemplary data router 21 in Internet 15 via data network connection 25. Calls for call center 67 originating from the PSTN and from Internet 15 are transmitted to telephone-data modem 61. Arriving calls are then routed over dedicated channels within trunk 65 to telephony-data modem 63 at call center 67. For example, a certain number of channels within trunk 65 are dedicated to carrying COST calls while the remaining channels are dedicated to carrying IPNT calls and other data. This is not a dynamic, but a fixed allocation, wherein the portion dedicated to COST transmission remains constant.

Calls that are received at telephone-data modem 63 from trunk 65 are routed appropriately depending on type of call. For example, COST calls are routed to switching apparatus 27, and IPNT calls are routed to data router 29. In both cases, further routing to agents is the same as described with reference to the prior art example of FIG. 1.

Although the network-data bridging technique, as described above with reference to FIG. 2, requires only one connection (65) to provide both COST and IPNT service to call center 67, trunk 65 is partitioned and requires expensive hardware on both ends to provide and maintain service. Further, agents face the same issues regarding handling separate types of calls as was previously described with reference to the prior art example of FIG. 1. The dedicated bandwidth issue is still a problem because the allocation of bandwidth in trunk 65 is fixed, while call loading by type will vary.

Figure 3:
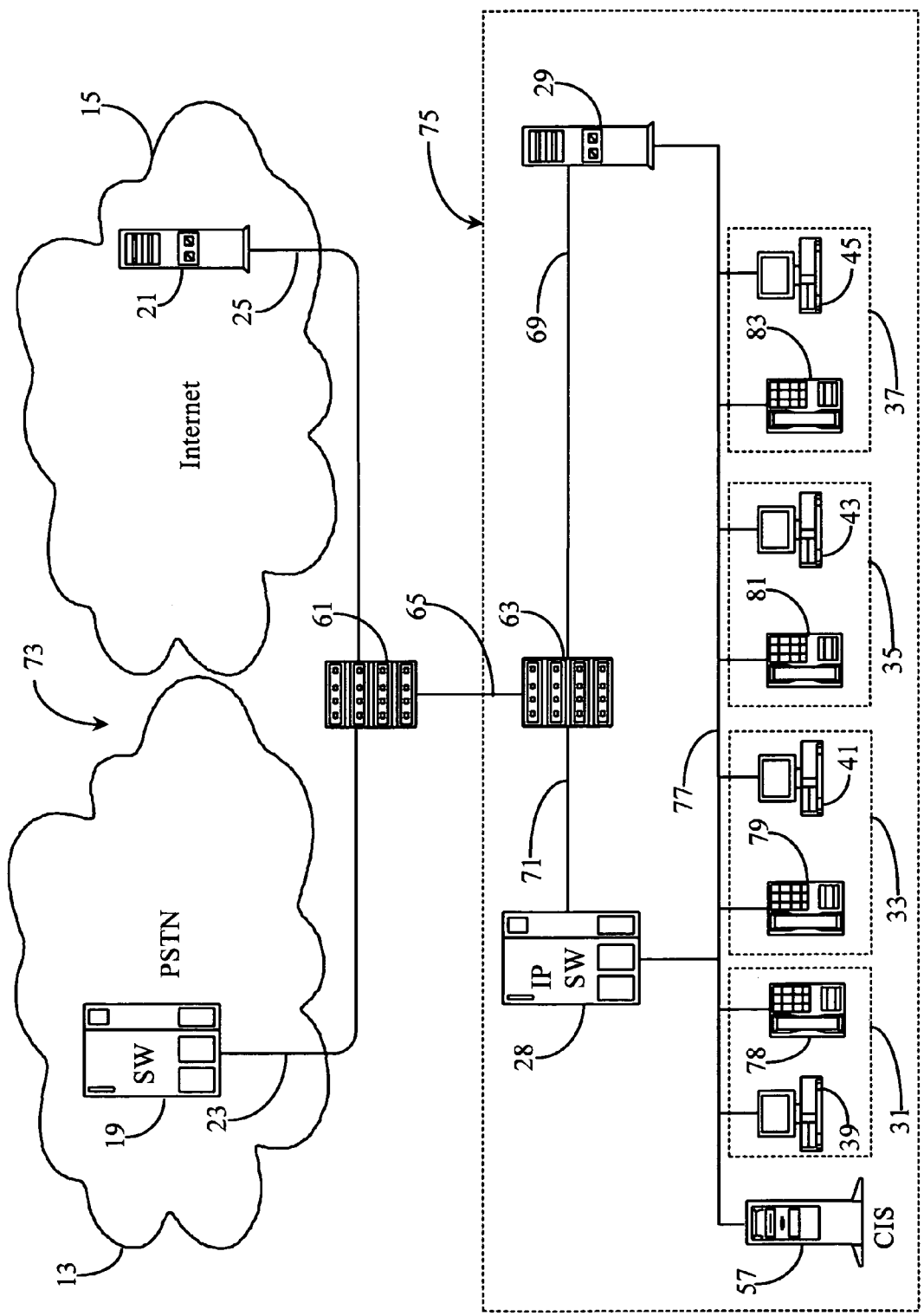
FIG. 3 is a system diagram of another call center with a dedicated bridge connection as in FIG. 2, comprising an IP telephony switch in the call center.

FIG. 3 is a system diagram of another system and art known to the inventors with a dedicated bridge connection as in FIG. 2, comprising an IP telephony switch in the call center. Telecommunications network 73 comprises PSTN 13, Internet 15, and call center 75. The architecture of telecommunications network 75 is similar to the architecture of the prior art example of FIG. 2 with at least two important differences. Firstly, call center 75 is enhanced with an Internet protocol (IP) central-telephony switch 28 that has the ability to convert PSTN call data to IP format, and to distribute the calls as IPNT calls on LAN 77. This enables incoming PSTN calls to essentially be converted into IPNT calls so far as receiving agents are concerned. Secondly, instead of regular ACD type telephones such as agent's telephone 49 of FIG. 2, each agent station 31, 33, 35, and 37 is equipped with an IP-telephone, such as telephones 78, 79, 81, and 83 respectively. Each IP-telephone such as IP-telephone 81, for example, is connected to LAN 77. LAN 77 is enabled for IP data as well as other data that may be transmitted from time to time.

In this prior art example, the requirement for COST telephone wiring such as wiring 56 of FIGS. 1 and 2 is eliminated. Incoming COST calls arriving at telephone-data modem 63 are sent over connection 71 to IP-telephony switch 28. IP-telephony switch 28 converts COST calls to IPNT format before routing the calls to individual IP-telephones over LAN 77. IPNT calls arriving from Internet 15 at telephone-data modem 63 are routed over connection 69 to data router 29 and on to agent's PC/VDU's or agent's IP telephones in the same procedure as described with reference to the prior art example of FIG. 2.

An advantage of this embodiment is that agents may handle both COST-IPNT calls (COST calls converted to IPNT format in IP-telephony switch 28) and regular IPNT calls with either a LAN connected IP-telephone or a LAN connected PC/VDU. Agent time is better utilized. However, the hardware used to facilitate the network-data bridging technique as described with reference to the prior art example of FIG. 2 is not eliminated. Therefore, cost savings is still relatively limited.

Figure 4:
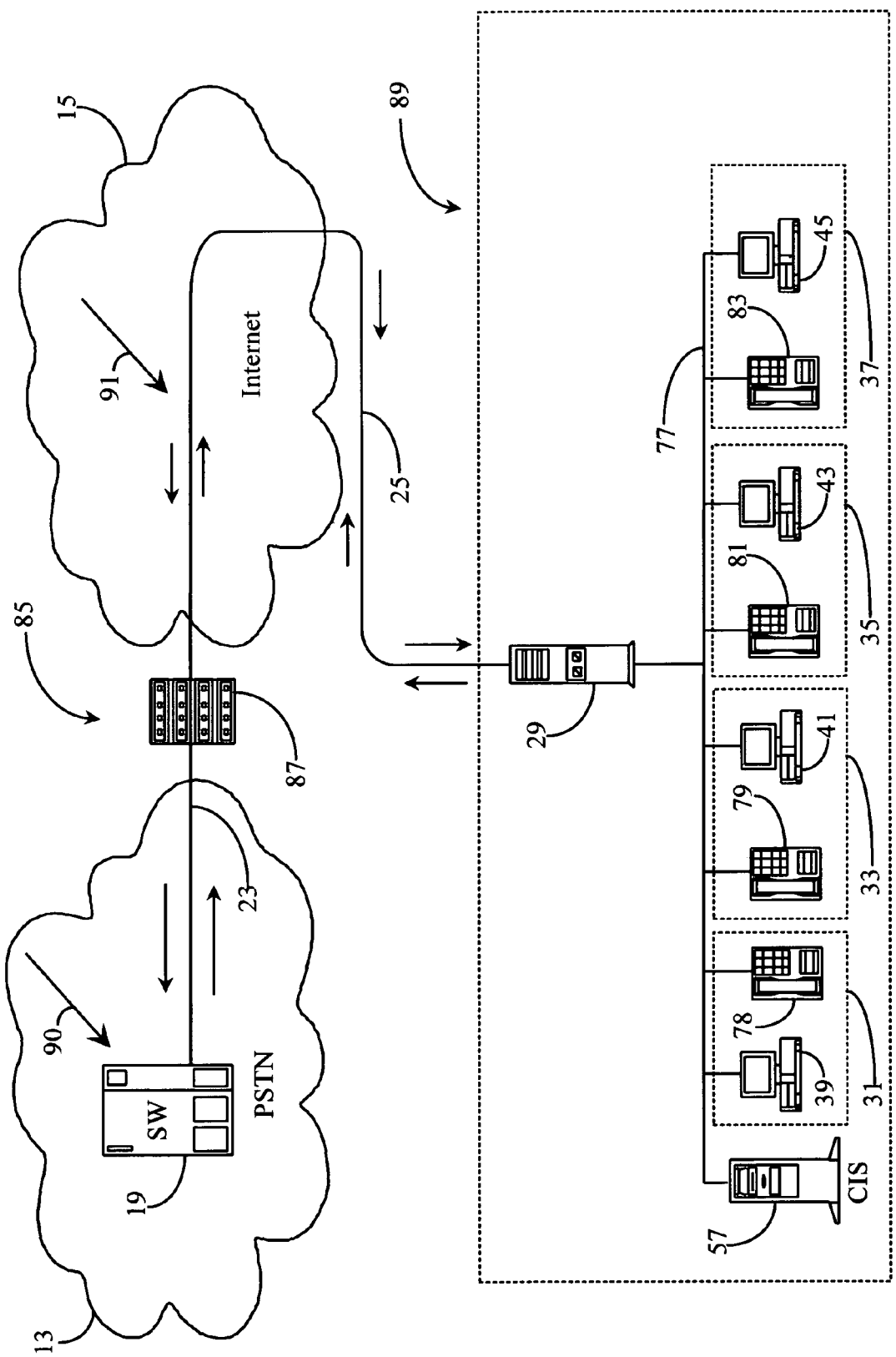
FIG. 4 is a system diagram of a DNT call center and connections to network level, including a unique bridge unit, in an embodiment of the present invention.

FIG. 4 is a system diagram of an IPNT call center and connections to network level, including a unique bridge unit, in an embodiment of the present invention. It is emphasized that the system shown and the description below of the system is exemplary only, and not limiting in the breadth of the present invention. The IPNT aspects of the call center could be implemented in a different, but still data network type protocol. Also the fact of a call center in the example is exemplary. The call center may be any DNT local or customer-premises type system, such as a telephone system at any company.

In this embodiment of the invention COST calls, represented in PSTN network 13 by arrow 90, are converted to IPNT format at the network level before being routed to a call center, and IPNT calls may also be converted to COST calls. This unique and innovative capability would, in a preferred embodiment, be provided by a local telephone company as a service to companies hosting IPNT call centers. The conversion, however, is not limited to the equipment of a local phone company. The conversion bridge may also be in the PSTN or other network, or in the Internet space. Conversion also is not limited to two networks, although examples to follow show two networks for simplicity in description. Bridge units according to the invention may connect to, and operate between three, four, or more networks.

Telecommunications network 85 comprises PSTN 13, Internet 15, and an IPNT-enhanced call-center 89. According to a preferred embodiment of the present invention, a COST-IPNT computerized bridge 87 is provided as a universal bi-directional connection between PSTN 13 and Internet 15. For example, bridge 87 has the ability to convert COST calls to IPNT and IPNT calls to COST format, and also to receive and place calls of both types.

In an example, COST calls received on trunk 23 may be associated with an IP address and routed through Internet 15 to a call center 89, or to any other IP address. In a preferred embodiment IP addresses are associated in a database either resident in the computerized bridge unit or accessible to the bridge. Companies having IP-only call centers may now advertise an 800 (or other no-charge-to-calling-party) COST number, that can be matched via the database to an IP address of a first data-router such as data router 29 within call center 89. Such a database may be relatively limited, such as to clientele of a local telephone company providing the service, or, in the opposite extreme, every COST number assigned in the world may be associated in such a database with an IP address.

Now, a call center such as call center 89 may be implemented as an IPNT-only call center, eliminating much hardware, software, and connectivity associated with prior art call centers. For example, because all incoming calls to call center 89 are now IPNT calls, expensive COST telephony switching apparatus normally found within call centers are no longer required. IP switching apparatus as shown in FIG. 3 is no longer required. COST telephony wiring such as wiring 56 of FIG. 2 is similarly eliminated. A range of other equipment and software associated with COST call centers is also eliminated. Call center functions are substituted with less expensive and easier managed IPNT counterparts running appropriate software applications. Expensive network cabling and hardware used in prior art bridging techniques as described with reference to FIGS. 2 and 3 above is eliminated as well. As a result, companies offering the service as well as companies hosting call centers realize substantial cost reductions related to previously required architecture and infrastructure.

Referring again to FIG. 4, PSTN callers may dial an 800 number, as previously mentioned, that connects them to bridge 87. A matching IP address is retrieved, typically from a database, and the COST call is then converted to IPNT format and routed via the best route available through Internet 15. All quality assurance techniques such as reserving bandwidth, compression techniques, special servers, firewall applications, encryption, and so on, as known to the inventors may be applied.

All incoming calls to call center 89 are now IPNT calls and are received and routed via data router 29 to agents working at agent stations 31, 33, 35, and 37. IPNT calls originating from a caller at a COST number are handled in the same way as IPNT calls originating from Internet 15. Thus, a seamless integration is achieved.

This innovative system and apparatus also works in reverse as follows: An IPNT call may be initiated by an agent within call center 89, perhaps as a call back to a COST caller, and connection may be achieved in a variety of ways. In one embodiment, bridge 87 has voice response or software code capability whereby an agent may offer a COST caller's phone number via spoken voice, software code, key stroke (if using PC/VDU), or touch tone (if using IP telephone) enabling a lookup and subsequent dialing of a COST caller's number. When the called party answers, conversation may ensue between the agent at call center 89 and the called party on a COST telephone connected anywhere to the PSTN network. Also, calls coming from the Internet cloud, represented by arrow 91, may be redirected over the bridge to a COST call center.

In an alternative embodiment, a COST telephone number may be encoded by an agent in call center 89 into an IP address of the bridge, and the bridge is adapted to extract that COST number from the IP address or other header in an incoming IP call from the call center. The coded portion of the IP address may also have just a key instead of the entire COST number, and the key may allow look-up in a stored table at the bridge to certain the COST number to which the call may be connected and translated.

In yet another alternative embodiment, customers may be given IP addresses if they do not already have one so that a general table listing PSTN numbers to IP address numbers may be created and kept both at call center 89 and at COST-IPNT bridge 87. In this instance, customers who do not own a computer would still have a registered IP address for matching purposes. An agent could supply the IP address via voice or other methods as previously described. A database of COST numbers and IP address matches could be far reaching and could conceivably include anyone weather they have patronized a call center or not, or weather they own a computer or not.

In some embodiments of the present invention, data router 29 would not be required. This would be a case wherein the method and apparatus of the present invention is used with a very small call-in location, perhaps operating only a few agent stations or, perhaps, only one agent station. COST-IPNT bridge 87 would route calls directly to the IP address of the agent's computer or IP. Further, routing may be accomplished via an agent's PC/VDU if there is more than one, but a relatively few operating agents.

In still another embodiment, back-up IP addresses may be programmed into COST-IPNT bridge 87 so that when a COST caller dials a free-to-calling-party number, after conversion to IPNT format a first IP address may be replaced by a second or back-up IP address if there is a long wait or if the first IP address is busy. In this case the converted call would be routed to the second choice IP address, and so on. This could be particularly useful for small business wherein only a few contacts are available and expense for a data router would be prohibitive.

Figure 5:
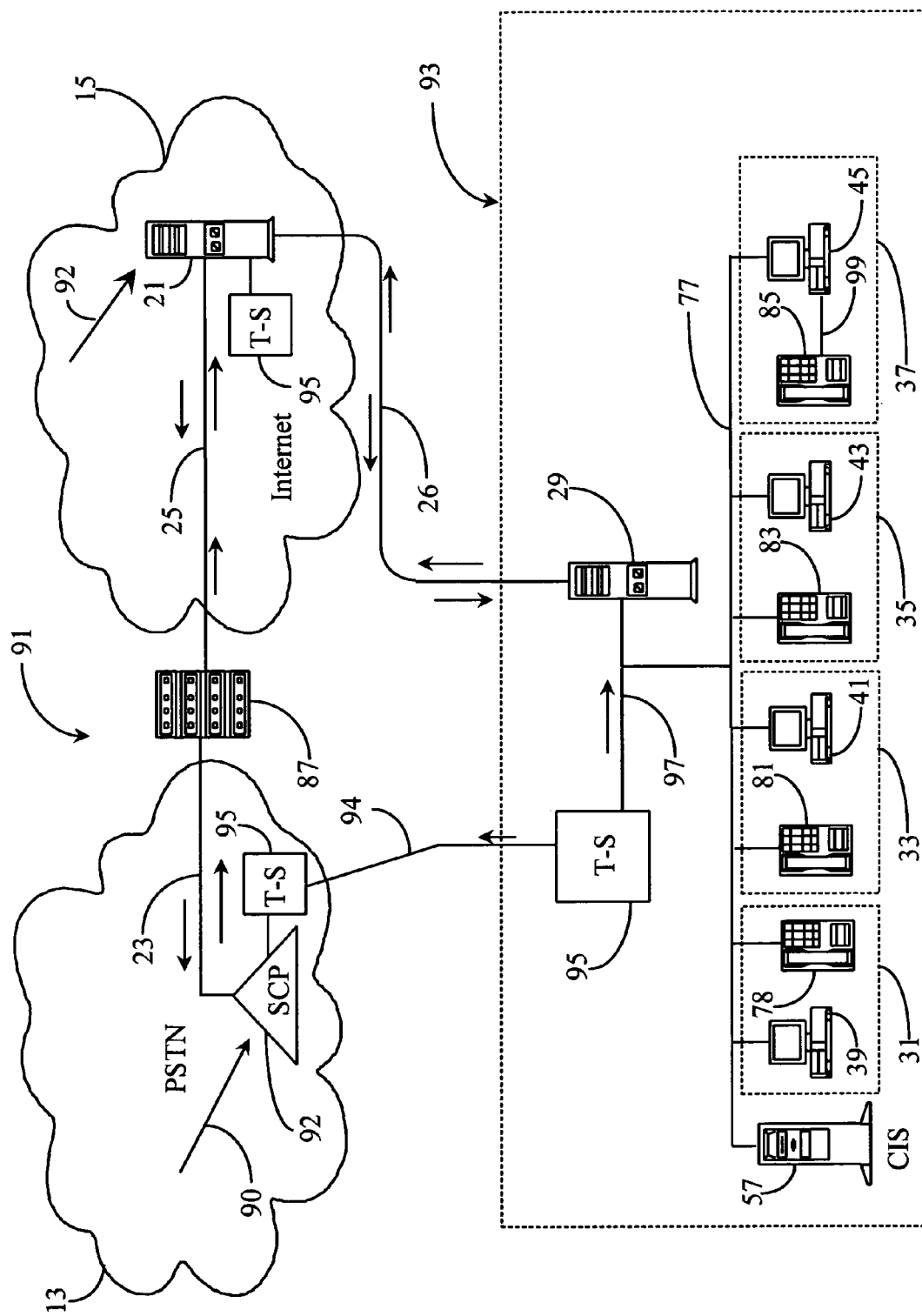
FIG. 5 is a system diagram of the unique call center system and connections of FIG. 4, further showing CTI enhancement.

FIG. 5 is a system diagram of the unique call center system and connections of FIG. 4, further showing CTI enhancement. In this embodiment sophisticated routing rules known to the inventors may be initiated and executed via transaction-server control over certain hardware (i.e. switches and routers) established in both PSTN 13 and Internet 15. This particular embodiment would most likely be utilized by large organizations hosting many call-centers, which may be spread over a large geographical region.

Referring again to FIG. 5, telecommunications center 91 comprises PSTN 13, Internet 15, COST-TPNT bridge 87 and an IPNT call-center 93. A service control point (SCP) 92 processes incoming COST calls represented by vector 90. A CTI processor 95 executing one or more CTI applications, and known as a T-Server (TS) is connected to router 29. T-Server 95 is connected in the call center to router 29, and monitors activity at router 29 and also exercises control at various levels over operation of router 29. That is, T-Server 95 may be informed of all incoming calls, exercise sophisticated routing rules, and control router 29 in following the routing rules. T-Server 95 is not limited to routing rules and algorithms, but may provide a considerable range of CTI functions. Router 21 can act as SCP for IPNT-originated calls 92, and may route them to the IPNT call center 93 or via the bridge to the COST network.

In this embodiment a second T-Server 95 is integrated with equipment at the network level, such as with the SCP in PSTN 13. The T-Server at call center 93 and the T-Server at the network level are connected by a digital link 94. Thus certain T-S routing and control routines (known to the inventors) can be executed at SCP 92. CTI hardware such as additional processors, stat-servers, intelligent peripherals, and the like that may be present in PSTN 13 are not shown but may be assumed to be present in this particular embodiment.

When a COST call arrives at SCP 92, information is typically obtained from the caller via IVR or other methods known in the art. This information may include call destination, purpose of the call, caller identity, etc. This information in some embodiments may be transmitted to call center 93 via link 94 before delivery of the actual call. Based on the information obtained at SCP 92 and, perhaps additional data supplied by T-S 95, the call is routed to a predetermined destination, in this case, COST-IPNT bridge 87 over telephone network connection 23. In another embodiment, T-S 95 may cause an incoming COST call to be routed to another COST-IPNT bridge, or some other destination.

As described with reference to FIG. 4, COST calls arriving at bridge 87 are routed through Internet 15 on data-network connection 25 as IPNT calls. The bridge serves as a dynamically translating interface. A data router 21 is shown connected to line 25 within Internet 15 and is used as a first destination of COST-IPNT bridge 87.

In some embodiments T-S 95 at the call center may also interact with router 21, exemplary of routers and IP switches in the Internet, via connection 26. There may also be instances of T-Servers 95 as shown associated with Internet routers and switches, which may communicate with T-Server 95 at call center 93, to provide CTI functions in the network initiated at call center level.

If it is determined by a T-Server 95 that a call has been miss-routed due to error, for example, it can reroute the call to another location in Internet 15, such as another routing point, or it can rout the call back to PSTN 13 through PSTN/IPNT bridge 87 where the call would be converted back to a PSTN call and sent back to SCP 92, or perhaps another location within PSTN 13. In this and other ways T-S 95 may exercise control over calls at the network level before a call arrives at call-center 93.

In the absence of rerouting, calls arriving at data router 29 are further routed to individual agents as they become available to handle calls. Either IP telephones such as IP telephone 83 or PC/VDU's such as agent's PC/VDU 45 may be used to answer calls. Also, conventional telephones may also be connected individually to PC/VDU's as is shown with reference to agent station 37. In this case, IP telephone 85 is not connected to LAN 77 but rather to PC/VDU 45 via a cable 99. Cable 99 would, in embodiments known to the inventors, acts as an interfacing cable connecting the telephones speaker and microphone functions to a sound card on PC/VDU 45 allowing an IPNT transaction to handled by a conventional telephone. There are several ways such an interface may be made.

The embodiment described with reference to FIG. 5 is useful where sophisticated routing rules are to be implemented. Load balancing between call centers, statistical routing, predictive routing, take-back-and transfer, and other functionality known to the inventors can be applied through T-Server control.

It will be apparent to one with skill in the art that the method and apparatus of the present invention may be used in very large call-center embodiments or in very small call-in centers without departing from the spirit and scope of the present invention. COST-IPNT bridge 87 can be set up to facilitate many companies of various sizes. For example, in one embodiment, a two man company or even an isolated salesman operating from a computer-enhanced sales-order desk may subscribe to a service providing advantages according to the present invention and have their IP address or addresses programmed directly into COST-IPNT bridge 87 so as obviate use of expensive telephone call center equipment.

In another embodiment, a large call center host organization may utilize the present invention with T-server control to distribute calls over a wide geographic region with many call centers and routing points. It will also be apparent to one with skill in the art that there may be many more than one COST-IPNT bridge such as bridge 87 distributed over different geographic locations, and that a single company may reserve access to more than one COST-IPNT bridge at those different locations.

Further, it will be apparent to the skilled artisan that the method and apparatus of the present invention may be applied to many varying network and call center architectures and infrastructures without departing from the spirit and scope of the present invention. For example, instead of applying the method and apparatus of the present invention to PSTN 13 and Internet 15, a private telephone network and a separate and private wide area data network may utilized, and so on. Also, call centers subscribing to services according to embodiments of the present invention may be pure IPNT call centers, or a combination of COST and IPNT. Such a case would be a large call center offering many different areas of service via IPNT whereas bill collection or credit analysis is still handled via COST telephony, and so on.

In yet another aspect of the invention, bridges similar to bridge 87 may be provided between any two protocol-incompatible networks. The interface and functionality described is not necessarily limited to connection-oriented networks interfacing with non-connection-oriented networks. Two DNT networks of dissimilar data protocol could be similarly linked, and two connection-oriented networks having incompatible call protocol could also be similarly linked, for example.

Simple Media Control Protocol (SMCP)

Figure 6:
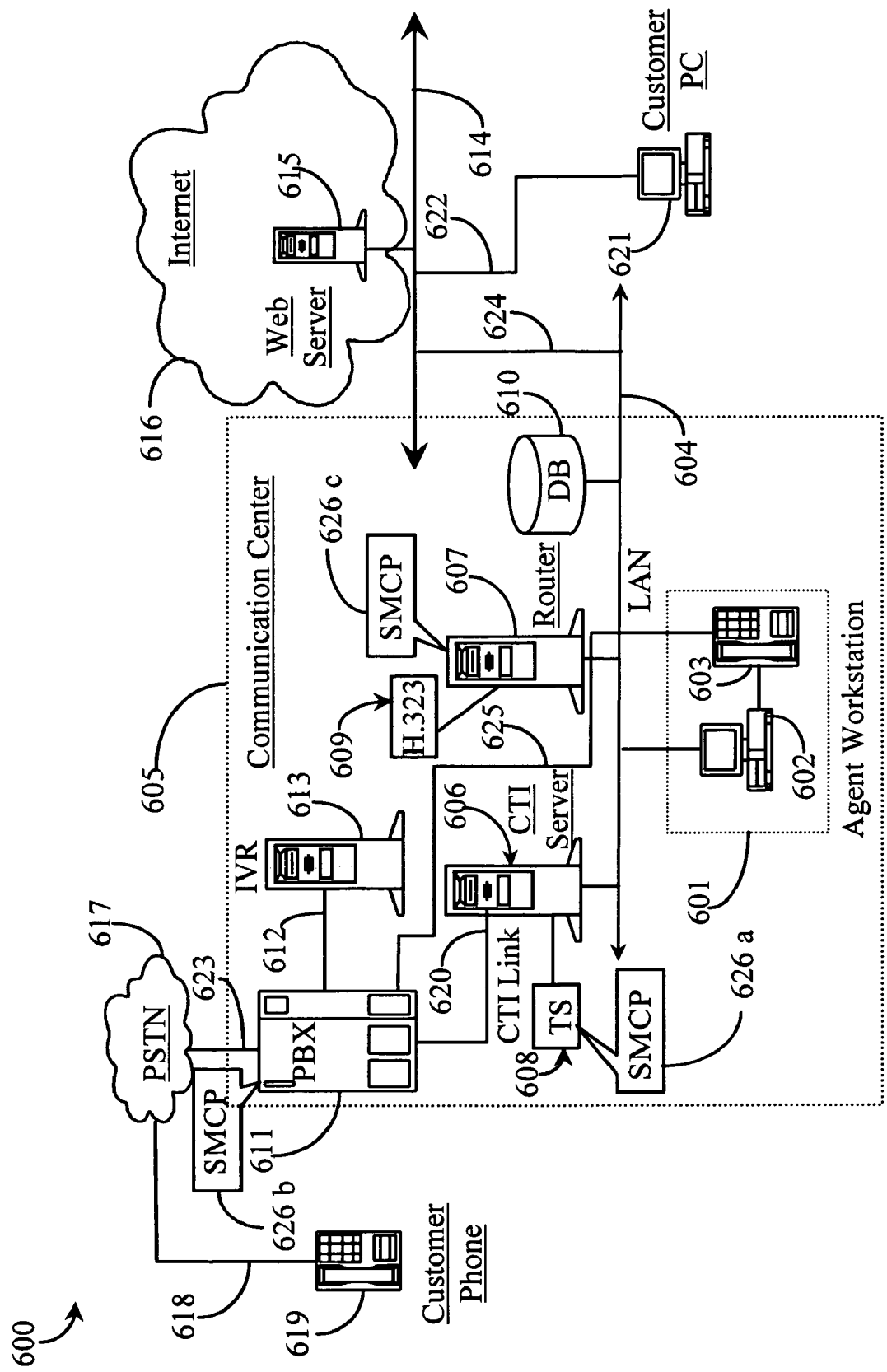
FIG. 6 is an architectural overview of a communication network practicing unique call-model management according to an embodiment of the present invention.

FIG. 6 is an architectural overview of a communication network 600 practicing call-model management according to an embodiment of the present invention. Communication network 600 represents a state-of-the-art network that enables dual communication center capabilities. Network 600 comprises a public-switched-telephony-network (PSTN) 617, a data packet network, which in this example is the well-known Internet network 616, and a dually-capable communication center 605.

PSTN network 617 may instead be a private telephone network instead of a public one. Internet network 616 may instead be a corporate wide-area-network (WAN), an Intranet network, or any other type of data packet network (DPN) that supports Internet protocol (IP) telephony. The inventors choose the PSTN network and the Internet network in this example because of high public-access characteristics and because of the existence of already developed and standardized protocols, which enable and enhance integrated telephony.

A customer telephone 619 is illustrated as connected to PSTN network 617 by way of a COST telephone line 618. It may be assumed in this example that within PSTN 617 there are a variety of telephone switches, servers control points, and gateways for enabling cross-network data conversion.

Internet network 616 has illustrated therein a Web server 615 shown connected to an Internet backbone 614. Internet backbone 614 represents all of the lines equipment and connection points that make up the Internet network as a whole. Web server 615 is configured as a customer-interfacing file server through which customers may initiate contact with communication center 605. It will be appreciated by those with skill in the art that a variety of other types of Web servers as well as IP data routers and other network equipment may be assumed to be present in network 616 having connection with Internet backbone 614.

A personal computer 621 labeled herein as a customer PC is illustrated as connected to Internet backbone 614 by an Internet-connection line 622. PC 621 may be any other type of Internet-capable device that supports IP telephony. Internet-connection line 622 may be assumed in this example to include an Internet service provider (ISP) and standard PSTN connection equipment, although none of these are illustrated. Any known Internet connection scheme may be employed with respect to enabling Internet access for PC 621 or equivalent appliance. One well-known common method is a typical dial-up modem connection through the well-known PSTN network using an ISP. Other well-known schemes include digital service line (DSL), integrated services digital network (ISDN), cable-modem connection, wireless Internet connection via a wireless modem, fiber optics, lasers and others. The inventors logically illustrate connection line 622, which is meant to include all possible Internet connection mechanisms and equipment.

Communication center 605 has a central telephony switch 611 illustrated therein, which in this example is a private branch exchange switch. Switch 611 is illustrated as connected to PSTN 617 by telephony trunk(s) 623. Customer phone 619 is meant to represent all possible callers accessing communication center 605 through PSTN 617. Customer PC 621 is meant to represent all correspondents accessing communication center 605 through, in this example, Internet network 616.

As was described in the background section of this specification, communication center 605, as a dually-capable communication center, supports a local area network (LAN), illustrated in this example as LAN 604. LAN 604 is connected to Internet backbone 614 by a network access line 624. Access line 624 logically represents Internet capability of communication center 605 for sending and receiving IP transactions including IP telephony. Actual Internet connection capability of communication center 605 may comprise a 24×7 connection or a dial-up connection. LAN 604 is enhanced to support Internet-based telephony and other Internet-based media transport technologies. In effect, LAN 604 may be considered a sub-network of Internet network 616.

Communication center 605 is capable of sending and receiving COST telephone calls as well as IP telephone calls. For example, incoming COST calls arrive at PBX switch 611 while incoming IP calls arrive on LAN 604 and interface with an IP router 607 illustrated within communication center 605 and connected to LAN 604. It is important to note herein that communication center 605 is not limited to the illustrated configuration represented in this example. For example, considering the network-level bridging capabilities illustrated with respect to FIGS. 3–5 of priority application Ser. No. 09/024,923, center 605 may be adapted and configured to operate according to any one of the illustrated architectures.

The exemplary configuration of communication center 605 shown in this example is used for the purpose of adequately describing various aspects of the present invention. Network-level bridging as described with reference to priority document Ser. No. 09/024,923 may be assumed to be present in this example. Moreover, CTI enhancement representing third-party call control, as illustrated with respect to FIG. 5 above is further enhanced in various aspects of the present invention.

Referring again to FIG. 6, a CTI server 606 is provided and illustrated as connected to LAN 604 via a LAN connection. CTI server 606 is adapted to provide third-party call control over illustrated switching entities (SWE) PBX 611 and IP router 607, to which this server is coupled. CTI server 606 has call control software installed thereon and illustrated in this example as transaction server (TS) 608. For the purpose of simple illustration, TS 608 is shown separately but logically connected to CTI server 606. TS 608 is analogous in many respects to T-S 95 illustrated in FIG. 5 above. For example, TS 608 contains routing and service logic required to successfully route calls from either PSTN 617 or Internet 616 within and in some cases without communication center 605. CTI server 606 is connected to PBX 611 by a CTI link 620. CTI server 606 establishes connection with router 607 by way of LAN 604. It is well known in the art that SW instances such as servers may sit on a variety of different computers in the network, and deliver the same functionality. It is therefore only as an illustration, what specific computers have been assigned which functions.

IP router 607 is adapted to communicate using protocol H.323 (609) as defined in the background section of the specification. Router 607 comprises a virtual switch matrix that defines all of the endpoint routing possibilities within communication center 605. Also connected to LAN 604 is an exemplary Agent's Workstation 601, further detailed by presence of an agent computer 602 and an agent telephone 603. Agent computer 602 is connected to LAN 604 by way of a LAN connection. Telephone 603 is connected to PBX switch 611 by an internal telephony wiring 625. It is noted herein that telephone 603 is also coupled to agent computer 602. This may be, for example, by way of a cable connected to any sound card installed within computer 602. This configuration, known to the s, allows telephone 603 to be used both as a COST telephone and an IP telephone. However, for purposes of the specification it will be assumed that telephone 603 is employed to handle COST calls from PSTN 617 while computer 602 is employed to handle IP calls arriving from Internet 616. Other architecture is possible, such as separate IP and COST telephones. A database facility (DB) 610 is provided and connected to LAN 604. DB 610 is adapted in this example as a customer information database and server (CIS) and is provided as a resource to communication center agents.

As was described with reference to the background section, one of the main challenges to enabling successful telephony with third-party control is maintaining consensus concerning a call model, attributes of which enable all third-party control functions. For example, PBX switch 611 is a vendor-provided switch conforming to a particular call model. TS 608 must have knowledge of that call model in order to be used to build third-party controls. IP router 607 also conforms to a particular call model for, in this example, VoIP conforming to protocol H.323. In order to provide third-party control over router 607, TS 608 must have knowledge of that model. Although it is not shown in this example, it may be assumed that there is also third-party control over network-level switches and IP routers. In this case, TS 608 must also have knowledge of the call models of those switches and routers that are to be controlled.

While telephony, Internet, and device protocols enable some third-party control, more so regarding PSTN control than DPN control, as described in the background section, requiring that all call models be reverse-engineered and emulated by TS 608 adds considerable complexity to a coherent and continually reliable telephone service capability as provided by communication center 605. For example, if communication center 605 replaces switch 611 with a switch from another vendor conforming to a different call model, TS 608 would have to be retooled (reprogrammed) in order to enable third-party control over the new switch. The same would be true regarding router 607. Even with the availability of such tools (e.g. Genesys T-Server™), there is a complexity involved, and that leaves room for mistakes, due to revision levels, SW errors etc.

In an embodiment of the present invention TS 608 is enhanced with an instance of a protocol software termed Simple Media Control Protocol (SMCP) by the inventors. An instance of SMCP 626a is illustrated as integrated with TS 608. An instance of SMCP 626b is illustrated as provided to PBX 611, and an instance of SMCP 626c is illustrated as provided to IP router 607. Instances of SMCP communicate with each other using a low-level software protocol that allows for only one call model to be emulated by TS 608 and provides access to switching entities 611 (PBX) and 607 (IP router).

It is reminded herein that a call model emulates a switch state of a switch or router manufactured by a vendor. It will be appreciated by one with skill in the art that not all switch states are universal and vendors are prone to adding modifications to their switch states, which must then be emulated by CTI software to continue reliable third-party control over such switches and routers. It will also be appreciated that there is a great richness and a variety of state-of-art controls and functions that enable many varying call behaviors. Therefore, the typical call model is very complex indeed. The challenge of providing reliable third-party control is especially difficult when dealing with distributive DPN environments such as VoIP wherein end devices and distributed gateways, if any, share switching intelligence.

SMCP 626 provides that only one call model need be established by the call controlling entity (CCE), namely CTI server 606. SMCP instances 626a, 626b and 626c need only provide definitive access to switching function without necessitating a complex call model. In this way, greater flexibility and reliability is realized in third-party or CTI server control over PBX 611. Moreover, the exact same call model for control over PBX 611 may also be used to control router 607 and provide all of the same PBX-based services to IP callers from Internet 616.

FIG. 7 is a block diagram illustrating a CTI-PSTN call-model management approach according to an embodiment of the present invention. In this example, there are 2 illustrated third-party control states, one at left, and one at right within FIG. 7. In a classic prior-art approach within a PSTN environment a CTI server 608 is illustrated and has a Call Model supported therein, the call model illustrated as an abstraction comprising a plurality of circles and directional arrows. The call model represents the actual switch state of a PBX or other telephony switch. The CTI server 608 may be analogous to CTI server 606 of FIG. 6 in a prior-art sense with no SMCP enhancement. The CTI server 608 communicates with a switch illustrated herein as switch 611 a by way of a CTI protocol link 700 analogous to CTI link 620 of FIG. 6.

Software running on switch 611a is illustrated herein as software 621 which contains a Call Model, hopefully identically emulated in server 608. Switch 611 may also have a switching matrix 702, which is the actual physical switch capability of switch 61 1a. In prior-art then, switch 608 provides a third party control over switching matrix 702 only by being able to identically emulate call model objects common in both call models. Control routines including call service and routing routines utilize the call model objects within their commands. Both machines must recognize and understand, by virtue of software, all included call model objects. If the call model of PBX software 621 is updated or changes in any way, the call model within CTI server 608 must be identically updated or retooled to reflect the update to avoid difficulty or failure.

Referring now to a preferred embodiment illustrated at right, a CTI server 704 is illustrated having a Call Model represented identically as the call model of CTI server 608. In addition to the described Call Model, CTI server 704 also has a thin SMCP stack or layer 705 installed therein and integrated with the CTI server Call Model. This combination is referred to as a Call Control Entity (CCE) in this specification. A Switching Entity (SWE) labeled 611b is assumed analogous to PBX 611 enhanced with SMCP 626b as described in a preferred embodiment with reference to FIG. 6. SWE 611b has identical (to Switch 611a) switching matrix 702 installed therein and also has a thin SMCP stack, which obviates the need for a call model. In actual practice of the present invention, call model objects contained within control routines in commands are described in low-level parameters using SMCP 705, which communicates to SMCP of SWE 611b over a communication link 703. Because SMCP is expressed in a low-level descriptor language, call model objects generic to the call model in server 704 can simply be described along with the commands for controlling switching matrix 702.

In this example, the actual switch state is represented by SWE 611b simply as a descriptor language with no high-level call model objects. In this example, all of the available switching embodiments may be accessed and controlled using SMCP in accordance to only one established call model maintained by the CCE, in this case, server 704.

FIG. 8 is a block diagram illustrating a CTI-IP call-model management approach according to a preferred embodiment of the present invention. This example represents 2 different CTI control states, and a CTI server representing a CCE controls an IP router analogous to router 607 of FIG. 6. A classic prior-art state is represented at the left of FIG. 8 while a preferred embodiment utilizing SMCP is illustrated at right.

Referring now to the classic prior-art representation, CTI server 608 communicates with an IP router 607a utilizing CTI protocol over a link 700. Link 700 may be analogous to LAN 604 of FIG. 6. As represented in FIG. 7, CTI server 608 contains a Call Model that emulates a Call Model provided with an IP router 607a and enabled by a software 621. The Call Model facilitated by software 21 includes a virtual switching matrix 702 defining the actual switch state and capability of IP router 607a. Call Model objects defined within software 621 must be identically emulated at CTI server 608 with respect to it's Call Model.

Virtual switching matrix 702 defines all of the edge computers and end points within a communication center that may accept IP calls. In this classic approach, CTI server 608 communicates through CTI protocol to IP router 607a in order to execute third-party control over virtual switching matrix 702, which defines the functional capabilities of IP router 607a. As was described above in the PBX embodiment with reference to FIG. 7, the mirrored Call Model within CTI server 608 must be retooled to reflect every update or change occurring within software 621 and the affected Call Model of IP router 607a. It will be appreciated by one with skill in the art that the Call Model representing the IP switching environment will add considerable complexity to an emulated Call Model in CTI server 608, assuming that a single call model will be constructed to handle both PBX and IP telephony within a given communication center. Moreover, because IP networks are disparate with respect to protocols, in call-routing and connection methods from a standard PSTN network more complexity is required to integrate CTI and IP communication, which must be accomplished to enable third-party control.

Referring now to a preferred embodiment of the present invention illustrated at right in FIG. 8, CTI server 704 is enhanced with SMCP stack 705 as was illustrated with respect to FIG. 7 above. However, in this example CTI server 704 communicates with a modified IP router 607b. The modification to IP router 607b involves eliminating the need to maintain a Call Model as is illustrated with IP router 607 a by virtue of providing a thin SMCP stack integrated with router software. CTI server 704 is termed a CCE and IP call router 607b is termed a SWE. Communication between the illustrated SMCP stacks is accomplished over link 703, which in the example of FIG. 6 is analogous to LAN 604.

Virtual switching matrix 702 is identical in both router a and router 607b. The advantage of using SMCP is that high-level objects do not have to be represented in two separate Call Models. Again, a low-level descriptor language represents the Call Model of CTI server 704 to router software, which in turn by virtue of SMCP, enables CTI access to virtual switching matrix 702. In this example, the Call Model emulated in CTI server 704 maybe identical to the PBX Call Model for providing third party control over a PBX switch. SMCP enables manipulation of virtual switching matrix 702 according to the service logic and intelligence available in the PBX model.

FIG. 9 is a block diagram illustrating an XML-based call-model management approach according to yet another embodiment of the present invention. In this example, a CTI server 800 is enhanced with a capability of providing third-party call control in a classic sense in a PBX embodiment and simultaneously using SMCP to provide control in an IP embodiment.

A CTI server 800 is illustrated with a Call Model 801 and a call-model manager (CMM), which is XML-based meaning that the low-level SMCP descriptor language is in fact XML. Switch 611a, which is analogous to switch 611 of FIG. 6 is a classic vendor-provided switch containing a Call Model and a switching matrix 702. CTI server 800 exerts third-party control over switch 611a by way of CTI protocol link 700 as was described with reference to FIG. 7 at left. A Call Model 801 enabled by CTI software emulates PBX software model 621 and normal CTI protocols are used in communication over link 700. XML-CMM 802 is a virtual Call Model expressed in XML language. XML-CMM 802 contains all of the XML attributes of Call Model 801.

CTI server 800 is the CCE while PBX switch 611a and SMCP-enhanced IP router 611b are SWEs. Note that the switching matrix 702 of IP call router 611b is a virtual matrix and is not identical to switching matrix 702 of PBX switch 611a. In this enhanced embodiment, only a single Call Model (801) is required to control PBX switch 611a in a classic CTI sense and for controlling IP router 611b using the novel SMCP protocol. It is noted herein that in embodiments illustrated and described with reference to FIGS. 7, 8 and 9, SMCP-enhanced SWEs contain no service logic or other intelligent routine logic.

It will be apparent to one with skill in the art that SMCP enhancement as described with reference to FIGS. 7–9 enables use of a single Call Model maintained only by a CCE (third-party controller) and that vendors of telephony switches and data-packet routers then need not maintain elaborate Call Models. All that is required to practice the present invention is to enable low-level access (command control) of a CCE to physical and virtual switching elements maintained in telephone switches and IP routers. As a result, much additional complexity and integration of protocols and provision of updated or revised Call Model objects is eliminated. More detail regarding SMCP capability is described below.

FIG. 10 is a block diagram illustrating SMCP control over interior and exterior call leg construction using a voice-switch commutator according to an embodiment of the present invention. As is known in the art, all telephony including IP telephony communications involve constructed connection states that make up call legs in the art. A call leg is essentially one-half of a connected call. Call legs in a PSTN environment are physical legs that are dedicated-connection oriented. Call legs in a VoIP environment are virtual call legs. A Call Control Entity (CCE) 1005, assumed to be a CTI server analogous to server 606 of FIG. 6, is illustrated herein and adapted to provide third-party control over an illustrated Switching Entity (SWE) 1000, which is assumed to be analogous in this example to IP router 607 of FIG. 6. In this example, CCE 1005 communicates with SWE 1000 via a LAN network 1004. Both CCE 1005 and SWE 1000 are enhanced with an SMCP stack. It is assumed herein that CCE 1005 maintains a Call Model providing all of the service logic and routing intelligence available within an applicable communication center environment.

A plurality of incoming IP telephony trunks 1003 are illustrated as ported to SWE 1000. A virtual switching matrix 1001 serves as a switching interface (software) between IP trunks 1003 and a like number of illustrated connection ports 1008. Call legs 1010, illustrated within switching matrix 1001 identified as interior call legs. For example, the upper-most connection port 1003 on SWE 1000 is illustrated as connected to the lowermost connection port 1008 using two interior call legs 1010. The point represented as the junction of the two interior call legs is a call connection point. That is, an incoming call to any of ports 1003 may be maintained with one interior call leg and any connection point. A second interior call leg must be constructed to complete the connection through switching matrix 1001 to any of ports 1008. Moreover, calls arriving at SWE 1000 wherein the final destination is on the same side of switching matrix 1001 have interior call legs connected to ports on a same side of SWE 1000.

Exterior legs are defined as legs exterior to SWE 1000. Exterior legs are represented in this example by element number 1009. It is important to note herein that legs 1009 do not represent separate physical data lines, but rather open data channels, which are logically illustrated.

In this example there is a grouping 1006 of IP telephony devices (End-User Devices) represented herein by an element number 1007. In this logical representation, it may be assumed that exterior legs 1009 are data channels established over LAN 1004 wherein IP devices 1006 are connected directly to LAN 1004 or indirectly to LAN 1004 through individual workstation computers. It is also noted herein that that CCE 1005 and SWE 1000 are represented as abstract modules in the sense that their physical embodiments depend on the exact architecture of a VoIP network. For example, if SMCP is used in an H.323 network, SWE 1000 may be implemented as a Gatekeeper. In an MGCP-based network, the role of SWE can be played by a Media Gateway Controller (MGC) and so on.

In this example, SMCP software assumes that SWE 1000 implements an abstraction of a commutating device allowing separate control of call legs both interior and exterior. That is, SWE 1000 must be able to ensure that externally invisible calls are kept established even when the commutating device tears down and then re-establishes internal connections (call legs). The SMCP stack of SWE 1000 represents the switching state and accepts commands from CCE 1005, which may be XML based or based on other low-level descriptive languages, the commands containing XML description of the various service objects and options generic to the call model of CCE 105.

FIG. 11 is a block diagram illustrating the voice-switch commutator of FIG. 10 implemented in an enterprise VoIP scenario according to an embodiment of the present invention. This example illustrates how SMCP is utilized in an actual VoIP scenario. A communication center LAN 1106 is used to connect a plurality of IP telephony devices represented herein as devices 1117. Each device 1117 has a virtual port 1116 associated therewith. A CCE 1103 (CTI Server) is running an SMCP stack 1105 and a SWE 1102 is running an SMCP stack. CCE 1103 is directly connected to LAN 1106 while SWE 1102 is illustrated as directly connected to LAN 1106 and to an IP gateway 1101

In this example, calls are routed to the communication center or enterprise center from Internet 1108 via an IP router 1110 onto LAN 1106. IP connections are established by commutating call legs within gateway 1101 by SWE 1102 running SMCP 1104. An IP interface port 1114 is provided as an input to gateway 1101. Gateway 1101 has a virtual switching-matrix modeled therein. Call legs are represented in this example by external legs 1113, and internal legs 1115. External legs are logically illustrated from Internet 1108 through router 1110, onto LAN 1106 and into IP port 1114. Internal call legs are represented from a connection point within gateway 1101 (switching matrix) to virtual device ports 1116, and in one instance, between two virtual device ports 1116. The latter illustration is exemplary of versatility of virtual connection.

Call legs are terminated at endpoints and are associated with physical or virtual ports. However, there are some situations that may arise wherein endpoints do not have associated virtual ports. Some ports can be used for support of multiple simultaneous connections. The parts of call legs outside of a switch or a gateway (1101) are called exterior; connections between them inside switches are interior. In this example, more than two call legs can be connected together to form a multi-party conversation.

Typically, endpoints can terminate only one call leg at a time. However, in some cases (for example, call treatment sources, such as music-on-hold) a single endpoint can be connected to multiple call legs. All endpoints have unique endpoint addresses represented, in preferred embodiments, as ASCII character strings. Depending on an exact application, such strings can be telephone numbers, URLs, E-mails, and so on. The exact naming scheme is application-specific.

Similar to other Internet protocols, SMCP messaging is text based. All messages exchanged between SMCP stacks contain only ASCII printable characters, spaces and tabs. Each message line is terminated with a CR-LF sequence (0D 0A hex.). Following is an example of actual message structure.

Message-verb reference-number CR LF
attribute-name: attribute-value CR LF
attribute-value-continuation CR LF
attribute-name: attribute-value CR LF
CR LF Message verbs and attribute names are strings composed of letters, digits and dashes. Attribute values are arbitrary strings of printable characters, spaces and tabs. An attribute value string can span several lines, with continuation lines starting from space or tab. An empty line (line containing only the CR LF sequence) terminates an entire message. All messages sent by a CCE will be referred to as requests, and all messages sent by SWE will be called events or notifications. Both sides must also send replies in response to received messages in a request response IP environment. Message reference numbers are generated by a CCE during communication. Reference numbers are unique decimal integer numbers used to match replies to requests. All requests and notifications must have reference numbers. SMCP protocol enables end devices to be implemented as less complex (intelligent) devices.

FIG. 12 is flow diagram illustrating basic steps for establishing an outbound call connection using XML-based SCMP. The following process steps illustrate a simplest successful outbound connection but do not illustrate optional treatment. At step 1200 there is no connection established as known for a pre-call state. At step 1201, a call request is sent. This step is initiated when a CCE sends a command to SWE to initiate a call request. It is noted herein that if a request is not valid, SWE responds with an error reply. If a chosen port is busy, SWE responds with a busy reply. Assuming herein that the request is valid, SWE allocates a call-leg identifier and returns it to CCE with a calling reply in step 1202. Step 1202 amounts to an outbound call request acknowledgement.

At step 1203, SWE initiates a transport connection to the endpoint selected in step 1201, and sends a Call Setup message to the endpoint, which replies with a Call Proceeding (CP Received) message indicating that the end point will assume further responsibility for completing the connection. SWE also sends a Call Alert message, which is received in step 1204. The CA message indicates that the call has been delivered to the end-user device, and the end user device has begun alerting the user via a ringing event or other alert.

If a called end user answers the event, the endpoint device called replies with a Setup message, thus initiating the process of establishing a transport connection to complete the connection. SWE informs CCE about this event with a Call Answered notification in step 1205. When a transport set-up is completed, the endpoint device replies with a call-connected or established notification in step 1206.

At any time during the sequence after a Calling notification in step 1202, SWE may inform CCE that the requested connection cannot be completed with a Dropped notification (not illustrated). If CCE did not send a Hang-up request for this call already, a Hang-up request must be sent to release the connection after receipt of a Dropped notification. XML primitives communicated through SMCP provide a reliable mechanism for manipulating or commutating the end-point sides of call legs in this example of out-bound calling. Other procedures not illustrated herein include configuration management, encryption, and fault tolerance.

It will be apparent to one with skill in the art that the process steps illustrated herein may be supplemented with many optional side routines integrated therewith without departing from the spirit and scope of the present invention. For example, intelligent routing routines and multiple party connections may also be implemented and integrated with the basic scheme of this example.

FIG. 13 is a flow diagram illustrating basic steps for establishing an incoming call connection using XML-based SCMP. For managing inbound calls arriving within an enterprise communication center SMCP utilizes four basic protocol data units Ring, Send CP, Send CA, and Answered.

In step 1300, there is no connection as the system is in the state of pre-arrival of an incoming call. At step 1301, SWE detects an Arriving call or attempt to set-up a transport (port to port) connection, accepts the request and reads the set-up message. SWE alerts CCE about the incoming event with a ring notification. At step 1302, CCE commands SWE to send a Call Proceeding message to the calling party with a Sending CP request in step 1302. At step 1303, a notification from SWE is received at CCE indicating that the Call proceeding message was sent and arrived at the calling party.

In step 1304, CCE instructs SWE to send a Call Alert (CA) notification to the requested calling party and wait for an OK reply. At step 1305, the Call Alert has arrived and the calling party is notified by a ringing event or other notification. At step 1306, CCE answers the call and requests that SWE perform the transport protocol negotiation with an Answer request, and wait for an OK reply.

In step 1306, SWE sends notification to CCE about success or failure of the requested negotiation. If the transport connection was successful the requested connection is considered established or answered in step 1307 and SWE sends an Answered notification to the CCE. It is important to note herein that at any time after an original Ring notification in step 1305, SWE may notify CCE that the requested connection was abandoned with a Dropped notification. If CCE did not send a Hang-up request for this call, this request must be sent to release the connection after receipt of a Dropped notification. After receiving any reply or notification pertaining to the current call leg, CCE may command SWE to drop the connection with a Hang-up request. After issuing a Hang-up request CCE waits for a Dropped notification from SWE before assuming that the port is available for a next call attempt.

SMCP media-stream commutation allows interconnecting existing exterior call legs in an arbitrary manner. The connections are established with a Make request and are torn down with Break or Hang-up requests. It is important to note that interior connections for different media streams related to a same call leg are different connections, and can be independently established or torn down. It is also noted herein that interior call legs may be established before exterior legs are completed.

It will be apparent to one with skill in the art that the process steps illustrated herein may be supplemented with many optional and or additional side routines integrated therewith without departing from the spirit and scope of the present invention as was described above with reference to FIG. 12. For example, advanced intelligent routing routines and multiple party connections may also be implemented and integrated with the basic scheme of this example. The inventors intend that the simplified process of this example represent just one basic implementation of connecting or establishing an inbound call using SMCP in a VoIP scenario.

Using XML-based primitives as a low level language for SMCP protocol enables one to control exterior and interior call legs. The control procedures allow one to develop different and varied third-party services whose logic is placed into the CTI Server as was described with reference to FIG. 6 above. Created services may include, but are not limited to any standard PBX-based service as well as complementary services like call transfer, call forwarding, conferencing, call hold, etc. These services and more may be provided in a VoIP environment without duplicating a call model in the SWE. Moreover, a wide variety of specific services can be provided that are not supported by standard PBXs.

Referring now back to FIGS. 12 and 13, XML messaging as used in SMCP provides a reliable mechanism for CCE, SWE communication and call leg commutation. Following is an actual example of an XML message Ring notification.

```
<?xml version="1.0"?>
<SMCP version="1.0">
<RING
    leg_ID ="12345"
    port="1392"
    protocol="h323v2"
user_information="SMCP_Callcenter_representative_007"
    DNIS="9131346"
    Caller="9131104"
    ANI="4371100"
    Ring_tone="urgent"
    peer_type ="conference">
        <codec
            media-type ="audio"
            codec-type ="g711"/>
</RING>
</SMCP>
```

The first line is a line common for all XML documents. It says that the following is a XML document and XML is of version 1.0. The second line contains a root tag <SMCP> telling that the XML document is a document related to SMCP vocabulary. In other words it says that the present XML application is SMCP protocol.

The third line opens a tag <RING> that corresponds to SMCP message RING. This tag has 9 attributes corresponding to parameters of the message. These are leg identification (ID), port, protocol, user information, destination number identification service (DNIS), caller, automatic number identification (ANI), ring tone, and peer type. The tag contains tag <codec> as a constant. The tag <codec> in its turn has two attributes media-type and codec-type corresponding to parameters of a Ring message. This fact enables use of multiple codec tags. The last two tags of the XML message terminate the message.

It will be apparent to one with skill in the art that the method and apparatus of the present invention may be utilized in any telephony environment including PBX, standard DNT and in VoIP type environments without departing from the spirit and scope of the present invention. In one embodiment, both classic PBX and VoIP architectures may be supported by a single server and call model. There are many possibilities.

The method and apparatus of the present invention should be afforded the broadest of scope under examination. The spirit and scope of the present invention is limited only by the claims that follow.

What is claimed is:

1. A system for providing third-party call control in a network-enabled telecommunications environment comprising:
   a call-control mechanism connected to the Network for providing service logic and routing intelligence for initiating call connections;
   a control application running on the call-control mechanism, the control application providing the service-logic description and connection request command instruction for implementing third-party controlled call connections;
   a call-switching mechanism operating at a public network level accessible to the call-control mechanism, the call-switching mechanism for providing an abstract state of switching matrix and for commutation of external and internal call legs making up a connected call; and
   a commutation application running on the call-switching mechanism, the commutation application for making and breaking call connections according to instructional commands sent from the control application;
   characterized in that the call-control mechanism using the control application sends primitive text commands to the call-switching mechanism, which utilizing the commutation application, receives, reads and implements the text commands containing all of the service logic and instructions required to successfully construct call connections at the public network level, and wherein the call-switching mechanism by virtue of the commutation application sends notification of success or failure regarding implementation of received commands back to the control application.

2. The system of claim 1, wherein the telecommunications environment includes a voice over Internet protocol (VoIP) network.

3. The system of claim 1, wherein the call-control mechanism is a computer-telephony-integration (CTI) server.

4. The system of claim 1, wherein the call-switching mechanism is a PBX telephony switch.

5. The system of claim 1, wherein the call-switching mechanism is an ACD telephony switch.

6. The system of claim 2, wherein the call-switching mechanism is a voice over Internet protocol (VoIP)gateway.

7. The system of claim 1, wherein the control application contains a call model, the attributes thereof defined in low-level descriptor language.

8. The system of claim 7, wherein the low-level descriptor language is extensible markup language (XML).

9. The system of claim 7, wherein the commutation application contains a representation of a switching matrix, the attributes thereof defined in low-level descriptor language.

10. The system of claim 9, wherein the low-level descriptor language is extensible markup language (XML).

11. The system of claim 1, wherein the telecommunications environment is an enterprise communications center connected for communication to a dedicated telephone network and to a data-packet-network.

12. The system of claim 11, wherein the telephone network is a public switched telephone network (PSTN) and the data-packet-network is the Internet network.

13. A method for providing third-party call control in a Network-enabled telecommunications environment comprising:
   (a) providing a call-control-entity, the entity having a single call model, the call model containing service logic, port identifications and identification of possible endpoints and gateways within the telecommunications environment;
   (b) expressing the singular attributes of the call model using a low-level descriptor language;
   (c) providing a physical and/or virtual switching matrix, the switching matrix containing the physical and/or virtual port identifications and states thereof expressed in the low-level descriptor language;
   (d) sending a command using the low-level descriptor language to a controller of the switching matrix, the command to initiate, at a public network level, a call connection based on selected attributes of the call model;
   (e) processing the command at the switching matrix; and
   (f) notifying the call-control-entity of the results of command processing at the switching matrix.

14. The method of claim 13 wherein in step (a), the call-control-entity is a computer-telephony-integration server and the telecommunications environment includes a Voice over Internet Protocol (VoIP) network.

15. The method of claim 13 wherein in step (b), the low-level descriptor language is extensible-markup-language (XML).

16. The method of claim 13 wherein in step (c), the switching matrix is that of a PBX telephone switch.

17. The method of claim 13 wherein in step (c), the switching matrix is that of an Internet protocol router.

18. The method of claim 13 wherein in step (c), the switching matrix is that of a Voice over Internet Protocol (VoIP)gateway.

19. The method of claim 13 wherein in step (d), the controller of the switching matrix is a software application that understands the low-level language.

20. The method of claim 13 wherein the telecommunications environment comprises the telecommunications center connected for communication to a telephone network and to a data-packet-network.

21. The method of claim 20 wherein the telephone network is a public-switched-telephone-network (PSTN), and the data-packet-network is an Internet network.

22. The method of claim 13 wherein in step (e), processing the command includes setting up and tearing down call legs.

23. The method of claim 13 wherein in step (f), notification of results is accomplished using low-level descriptor language.

24. The method of claim 23 wherein in step (f), the low-level language is extensible markup language (XML).

* * * * *